US011483347B2

(12) United States Patent
Erb et al.

(10) Patent No.: US 11,483,347 B2
(45) Date of Patent: Oct. 25, 2022

(54) HIGH PERFORMANCE DISTRIBUTED SYSTEM OF RECORD WITH SECURE INTEROPERABILITY TO EXTERNAL SYSTEMS

(71) Applicant: Akamai Technologies, Inc., Cambridge, MA (US)

(72) Inventors: Samuel Erb, Somerville, MA (US); Mark A. Roman, Arlington, MA (US); Talmai Oliveira, Cambridge, MA (US); David C. Carver, Lexington, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 112 days.

(21) Appl. No.: 16/695,521

(22) Filed: Nov. 26, 2019

(65) Prior Publication Data
US 2020/0186568 A1   Jun. 11, 2020

Related U.S. Application Data

(60) Provisional application No. 62/775,684, filed on Dec. 5, 2018.

(51) Int. Cl.
*H04L 9/40*   (2022.01)
*H04L 9/08*   (2006.01)
(Continued)

(52) U.S. Cl.
CPC ....... *H04L 63/166* (2013.01); *G06Q 20/3674* (2013.01); *H04L 9/0894* (2013.01);
(Continued)

(58) Field of Classification Search
CPC ... H04L 63/166; H04L 9/0894; H04L 9/3236; H04L 63/10; H04L 2209/38;
(Continued)

(56) References Cited

U.S. PATENT DOCUMENTS 9,813,343 B2 * 11/2017 Williams ............ H04L 67/1023
2010/0161959 A1   6/2010 Sood
(Continued)

FOREIGN PATENT DOCUMENTS

JP   2018-018348 A   7/2018

OTHER PUBLICATIONS

PCT/US2019/064596 International Search Report and Written Opinion n dated Apr. 10, 2020.

*Primary Examiner* — Catherine Thiaw
(74) *Attorney, Agent, or Firm* — David H. Judson

(57) ABSTRACT

A high-performance distributed ledger and transaction computing network fabric over which large numbers of transactions (involving the transformation, conversion or transfer of information or value) are processed concurrently in a scalable, reliable, secure and efficient manner. In one embodiment, the computing network fabric or "core" is configured to support a distributed blockchain network that organizes data in a manner that allows communication, processing and storage of blocks of the chain to be performed concurrently, with little synchronization, at very high performance and low latency, even when the transactions themselves originate from distant sources. This data organization relies on segmenting a transaction space within autonomous but cooperating computing nodes that are configured as a processing mesh. Each computing node typically is functionally-equivalent to all other nodes in the core. The nodes operate on blocks independently from one another while still maintaining a consistent and logically-complete view of the blockchain as a whole.

16 Claims, 14 Drawing Sheets

(51) Int. Cl.
    *H04L 9/32*          (2006.01)
    *H04L 9/00*          (2022.01)
    *G06Q 20/32*        (2012.01)
    *G06Q 20/36*        (2012.01)

(52) U.S. Cl.
    CPC ........ *H04L 9/3236* (2013.01); *H04L 63/0869* (2013.01); *H04L 63/10* (2013.01); *G06Q 2220/00* (2013.01); *H04L 9/50* (2022.05); *H04L 2209/56* (2013.01)

(58) Field of Classification Search
    CPC ............ H04L 2209/56; H04L 63/0869; G06Q 20/3674; G06Q 2220/00
    See application file for complete search history.

(56) References Cited

U.S. PATENT DOCUMENTS

| | | | |
|---|---|---|---|
| 2017/0279774 A1 | 9/2017 | Booz et al. | |
| 2018/0191503 A1 | 7/2018 | Alwar et al. | |
| 2019/0109713 A1* | 4/2019 | Clark | H04L 9/3239 |
| 2019/0182028 A1* | 6/2019 | Arquero | H04L 9/3239 |
| 2019/0347651 A1* | 11/2019 | Moreno | G06Q 20/385 |
| 2019/0349254 A1* | 11/2019 | Nolan | H04L 67/10 |
| 2020/0119925 A1* | 4/2020 | Wang | H04L 9/3297 |
| 2020/0126441 A1* | 4/2020 | Garg | H04L 9/3247 |

\* cited by examiner

HIGH PERFORMANCE DISTRIBUTED SYSTEM OF RECORD WITH SECURE INTEROPERABILITY TO EXTERNAL SYSTEMS

BACKGROUND

Technical Field

This application relates generally to managing a distributed system of record across a set of computing resources in a distributed network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

A blockchain is a continuously growing list of records, called blocks, which are linked and secured using cryptography. Each block typically contains a cryptographic hash linking it to a previous block, and transaction data. For use as a distributed ledger, a blockchain typically is managed by a peer-to-peer network collectively adhering to a protocol for validating new blocks. Once recorded, the data in any given block cannot be altered retroactively without the alteration of all subsequent blocks, which requires collusion of the network majority. Blockchains are suitable for the recording of events, various records management activities (such as identity management, transaction processing, documenting provenance, etc.) and others. Generalizing, a blockchain is a decentralized, distributed and digital ledger that is used to record transactions across many computers so that the record cannot be altered retroactively without the alteration of all subsequent blocks and the collusion of the network. In a typical blockchain, blocks hold batches of valid transactions that are hashed and encoded into a data structure. In this structure, and as noted above, each block includes the cryptographic hash linking it to the prior block in the blockchain. The linked blocks form a chain. This iterative process confirms the integrity of the previous block, all the way back to the original genesis (or first) block.

Blockchain implementations may be used to support a variety of application areas, some of which have elevated security requirements. In known systems, such as Bitcoin, Etherium and their derivatives, a main focus is on securing the private keys that are used by wallets (namely, to spend value associated with the wallet). In addition, wallet security continues to be an important consideration in the design and implementation of such systems, and there are also a set of extended use cases, e.g., hosted or server-based wallets, server based co-signing or multiple signature-based transactions, and administrative management of accounts and associated value, that present additional security challenges. In particular, these capabilities offer significant benefits, but they may also increase the attack surface, i.e., the number of and paths of potential compromise.

BRIEF SUMMARY

This disclosure provides for a high performance distributed ledger and transaction computing network fabric over which large numbers of transactions (involving the transformation, conversion or transfer of information or value) are processed concurrently in a scalable, reliable, secure and efficient manner. In one embodiment, the computing network fabric or "core" is configured to support a distributed blockchain network that organizes data of the blockchain in a manner that allows communication, processing and storage of blocks of the chain to be performed concurrently, with little synchronization, at very high performance and low latency, even when the transactions themselves originate from remote sources. This data organization relies on segmenting a transaction space within autonomous but cooperating computing nodes that are configured as a processing mesh. Each computing node typically is functionally-equivalent to all other nodes in the core, and preferably each node can carry the entire load of the system. A computing node typically comprises a cluster of computing, communications and storage elements. More generally, all computing nodes that comprise the core network preferably are considered to be equal to one another, and no individual node, standing alone, is deemed to be trustworthy. Further, with respect to one another, the nodes operate autonomously, and preferably no node can control another node. The nodes operate on blocks independently from one another while still maintaining a consistent and logically complete view of the blockchain as a whole.

In one embodiment, the processing core is accessible via edge networks, e.g., the edge servers of an overlay network, such as a CDN. In this embodiment, a CDN edge network supports a globally-based distributed system that provides a message processing service, wherein messages are associated with transactions. End user machines and services interact initially with the CDN edge network, which then routes transactions requests and responses to and from the core, with the core supporting a distributed system of record.

According to another feature, the above-described distributed system of record architecture includes hosted origin services and associated security technology that provides legacy payment network operators with highly-secure and resilient access to a blockchain-based payment system.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Overall High Level Design

Figure 1:
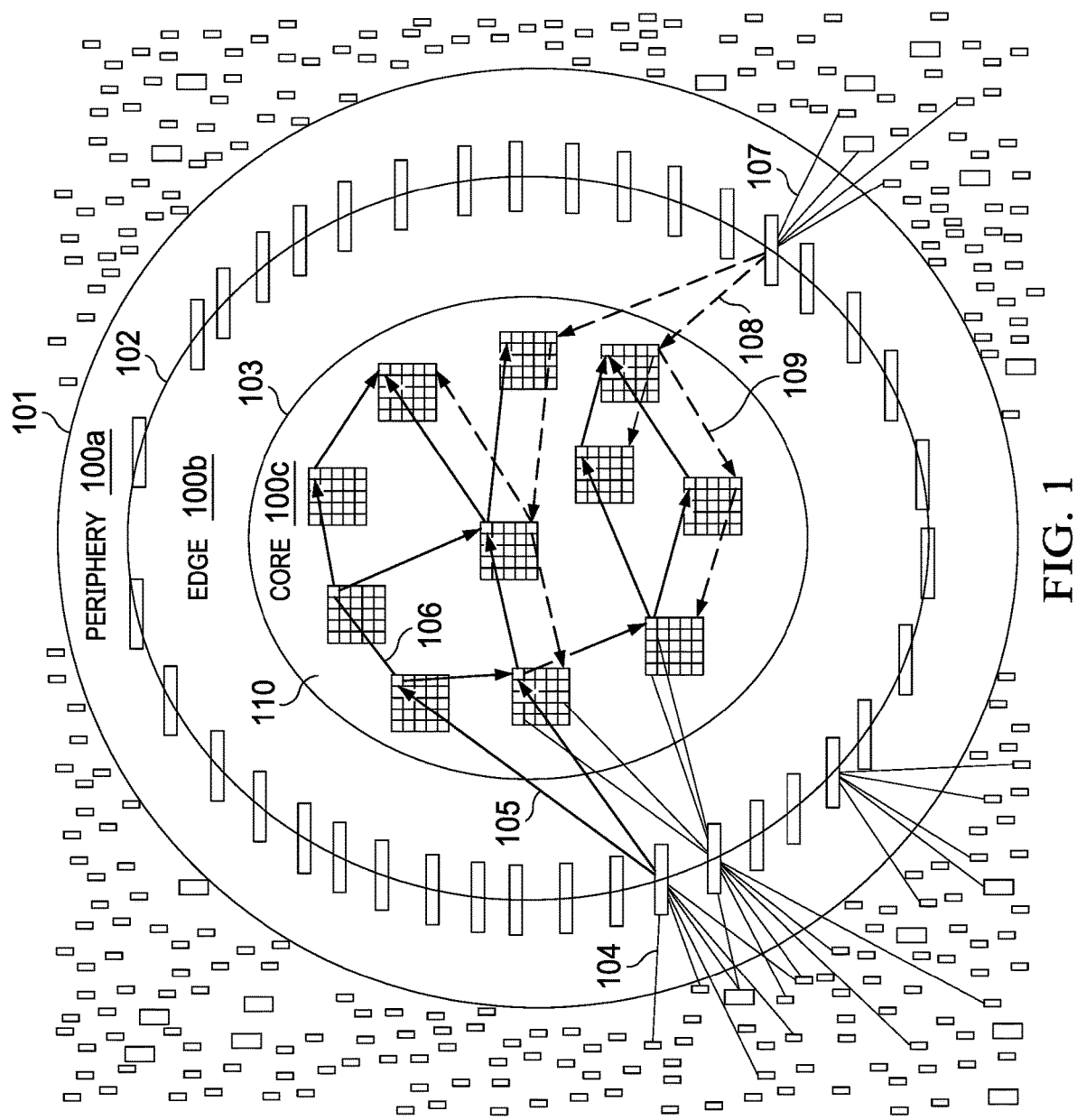
FIG. 1 is a block diagram illustrating a networking architecture that provides a distributed system of record with transactions organized into a blockchain according to this disclosure.

FIG. 1 depicts a scalable, high performance architecture for implementing a distributed system of record with transactions organized into a blockchain. At a high level, the system is divided into multiple functional areas as shown, namely, a periphery 100a, an edge 100b, and a core 100c. The system may comprise other functional areas to facilitate delivery, administration, operations, management, configuration, analytics, and the like, but for simplicity these areas are not depicted. As used herein, the periphery 100a refers generally to elements associated with a boundary 101. These elements typically include client-server based electronic wallets or wallet devices, terminal and point of sale devices, legacy financial network elements and associated adapters. Generally, and as used herein, any element involved with creating and consuming transactions including, without limitation, financial transactions, may be an element in the periphery 101. The periphery may extend globally. The edge 100b typically refers to the elements of an overlay network associated with boundary 102. Representative elements include, without limitation, the processing, communication and storage elements (edge servers, switches/routers, disks/SSDs) running on an overlay edge network (e.g., a CDN such as Akamai®). A CDN such as described advantageously provides low latency points of presence (relative to the end users/devices) that aggregate and, as will be described, route requested transactions and their associated results (to and from elements in the periphery) efficiently. Wallet services may be located within the edge. The edge elements also act individually, collectively, and in conjunction with other services as a security perimeter protecting the core 100c from attacks and other adversarial activity. While a CDN-specific implementation is preferred, a typical edge network in the system herein need not be limited to a CDN edge network. Any suitable network, new or extant, could be used including, without limitation, cloud-based systems.

The core 100c refers to elements associated with boundary 103. As will be described, preferably the core 100c is a high performance network of nodes that together support the processing and storage of transaction blockchain(s) meeting specified performance requirements including, but not limited to, throughput, response time, security and data integrity. A node (sometimes referred to as a "computing node") in this context typically is a cluster of computing, communications, and storage elements. More generally, a cluster as used herein refers to one or more, and possibly many, computing, communications, and storage elements. In one embodiment, the core 100c comprises overlay network nodes, although this is not a requirement, as the core 100c may comprise a set of nodes distinct from the CDN and dedicated to the core operations (as will be described). Typically, computing nodes are interconnected by network transits and have a high degree of interconnectivity to reduce or eliminate topological bottlenecks.

To facilitate high performance, preferably the core network is constructed using a high quality, high capacity, and diverse interconnect. The particular configuration of the core network typically is implementation-dependent, at least in part based on the nature of the consensus protocol that is implemented in the blockchain. Depending on the consensus protocol used, the size of the core network (and/or the distribution of various computing nodes therein) may also be constrained as necessary to ensure sufficiently low latency network communications across the core.

In one non-limiting implementation, the CDN edge 100b supports a globally-based service having associated therewith a core network 100c (e.g., that is located across a plurality of networked data centers in a given geography).

Referring again to FIG. 1, message 104 is an example of a device (e.g., an end user device, an electronic wallet, etc.) sending a transaction request to an edge server (e.g., such as a CDN edge server). It should be appreciated that a multitude of such messages (and that will be sent to and processed by the core network as described herein) are expected to originate from server, devices, and wallets worldwide. The messages may be transmitted over persistent connection or ephemeral connections, as well as via new or extant networks where those networks may be part of legacy or network infrastructure purpose built to natively support the system capabilities described herein. Further, messages may be sent to one or more edge servers to reduce reliance on any single point of ingress to the system.

Message 105 is an example of an edge element routing transactions (possibly including the one contained in message 104) to an appropriate element in a core node 110 (a set of which nodes 110 are depicted). For a given transaction there may be multiple messages 105 that route the same transaction or a hash (or other digest) of the same transaction to the appropriate element in other core nodes. It is not required that all messages 105 contain a full representation of a transaction. A digest of a transaction may be transmitted (1) to make core elements aware of the existence of a transaction, and (2) to provide a robust way to check the integrity of messages containing full transactions. This enables complete, yet efficient, propagation of incoming transaction messages to the appropriate elements in all core nodes. It also greatly reduces the network loading associated with traditional gossip protocols and yet provides protection, e.g., from compromised edge elements censoring or corrupting transactions.

Message 106 is an example of a core node element routing transactions to the appropriate element in another core node. There may be multiple messages 106, such that a core node element participates in propagating transactions or transaction digests across the core nodes of the system. Core nodes receiving message 106 may, in turn, generate other messages 106, further propagating the messages across the core nodes of the system.

Topology-Aware Data Propagation

While any data propagation protocol may be employed, one preferred approach herein is to improve upon cost and latency of traditional randomized peer-to-peer gossip protocols by shaping the propagation to the underlying network topology. In concert, messages 104, 105, and 106 comprise paths of propagation starting with topologically most proximate elements and reaching topologically less- or least-proximate elements. A device that sends messages 104 to other edge elements typically follows different paths of propagation across the network. This is illustrated by the messages 107, 108, and 109 propagating in a different direction. Further, the path of propagation starting from a given device, in general, may change over time to achieve proper load balancing and security.

Service Discovery and High Performance Mapping

Again referring to FIG. 1, before any messages are sent, each element originating a message typically must discover the address of the receiving element. An address may be an Internet Protocol (IP) address or some other name or number in an address space in some type of network (e.g., peer-to-peer network or overlay network). Discovering the address of another element can be achieved in a variety of ways but generally involves sending a set of element attributes to a discovery service and receiving address information in return. In one embodiment that is preferred, the attributes of the system elements to be discovered are encoded as domain names, thereby allowing the system to use a CDN's high performance domain name lookup services to return the necessary address information. Using an overlay network's mapping technology offers several advantages. It supports large domain name spaces to enable even the largest scale deployments. This enables an edge element, for example, to route transactions not just to a core node, but even to specific elements in the core node that handles the associated portions of the transactions' identifier space. This same type of fine-grained routing can be done for communications between core node elements; in particular, and using CDN DNS services, an element in one node handling a set of segments, partitions, or other groupings of transaction information can send messages directly to elements in other core nodes that handle the same segments, partitions, or other groupings of transaction information. This is advantageous because although traffic may traverse a common set of low level network routers/switches, the core nodes need not inspect and route each transaction individually. The use of the CDN name services in this manner also supports reconfiguration. In particular, when a node's configuration changes, for example, because responsibility for some portion of the transaction space is transitioned from one server to another, the changes are quickly and efficiently communicated via the name service's mapping system. Another advantage of using the CDN name services supports the notion of suspension. Thus, in the event an edge element or core node element becomes impaired or inoperative, the mapping system can map traffic away from the problem. A further advantage of using the CDN name service is the ability of such systems to support load balancing of traffic based on high resolution capacity consumption measurements. This approach also supports route and region diversity, such that a device in the periphery may receive addressing information for edge elements that share minimal underlying service and network components. CDN DNS services also support latency optimization. For example, core node elements may receive addresses for other core node elements that meet some proximity criteria.

An alternative embodiment utilizes location or direction-aware mapping. Thus, for example, a core node element may use domain names encoded with location or direction information (either geographic or topological direction) such that responses provide addresses to node elements that are in a desired location or direction or that comprise a directional graph. This capability may be intrinsic to the mapping system or an adjunct thereto. Topological mapping in this manner provides for a low latency, topology aware data propagation mechanism.

Generalizations

As used herein, a block generally refers to any aggregation or association of transaction data. There is no specific format required. A blockchain is a continuously growing list of records, called blocks, that are linked and secured using cryptography. Each block in a blockchain typically contains a cryptographic hash linking to the previous block, and transaction data. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

While the techniques herein may use a blockchain to record transaction data, this is not a limitation, as the architecture and associated transport mechanism of this disclosure system is also applicable to other organizations of transaction data. Moreover, the notion of a blockchain, as in a chain or sequence of blocks, may be any organization of blocks including, without limitation, a block tree, a block graph, or the like.

Mining is the act of generating an ordered block of transactions with a header that references a previous block in the blockchain. In public (permissionless) blockchain consensus systems, mining generally is structured as a competition; if a generated block (and its ancestors) survive the mining competition and subsequent consensus process, it is considered finalized and part of the permanent record. In an ideal system, mining responsibility from one round to the next (i.e., from one block to the next) is randomly-dispersed across participants. Formally, in an ideal system, mining decisions are not predictable, not capable of being influenced, and are verifiable. In real world applications, however, the dispersion need not be perfectly random. For example, in proof-of-work systems, the dispersion is not actually random, as entities with more mining power have a higher probability of winning the competition.

Segmentation

Traditional blockchain implementations treat the blockchain as a simple sequence of blocks. Such approaches severely limit the achievable performance of blockchain implementations, typically by creating bottlenecks in processing, communicating and storing the blockchain in its aggregate form.

In contrast, the approach described here departs from known techniques by organizing the data of a single chain in a manner that allows its communication, processing and storage to be performed concurrently, with little synchronization, at very high performance. Preferably, and as will be seen, this data organization relies on segmenting the transaction space within each node while maintaining a consistent and logically complete view of the blockchain. This approach may also be applied to each of multiple chains that comprise a set of federated or sharded blockchains, and to improve the performance of the blockchain operation thereby reducing the work and increasing the performance of off-chain (so-called "Layer-2") systems.

In this approach, the consensus algorithm that spans the network is used to ensure the system produces correct finalized results. The particular consensus algorithm(s) that may be used are not a limitation. Operations within each node, however, assume the elements of the node are correct and trustworthy. If a node fails or is corrupted by an adversary, the system relies on the rest of the network to maintain service integrity and availability as well as to support failure and intrusion detection functions. As will be seen, this design architecture enables the internals of a node to be organized as a loosely-coupled distributed system running on a high performance, low latency communications fabric such that system elements are aligned with the blockchain data organization. The resulting architecture provides a much higher performance implementation as compared to known techniques.

Block Segmentation

Figure 2:
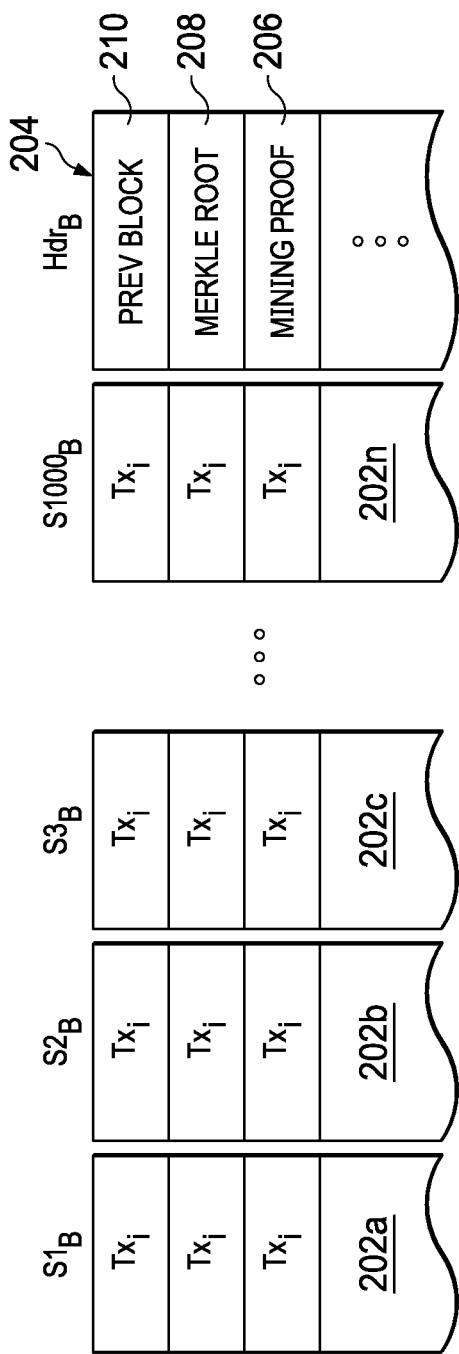
FIG. 2 depicts a block segmentation according to the technique herein.

Referring to FIG. 2, a block 200 is segmented by transaction id ($Tx_i$) into some number of segments 202a-n, where n=1000, and a header 204. The segments 202 and header 204 represent a block of the blockchain although they may be (and often are) processed, transmitted and stored separately. The number of segments 202, shown in FIG. 2 as 1000, may be more or fewer in number and may change over time or dynamically. Preferably, a sufficient number of segments is selected to create a space that is large enough to enable substantial future growth of the underlying resources without having to change the segmentation (the organization) of the data.

In this embodiment, block segmentation typically is an externally visible attribute shared by all nodes of the network. As will be seen, organizing the block data by segment significantly improves the performance and efficiency of nodes exchanging block information. In particular, the approach herein enables the components of a node responsible for handling a given segment to communicate directly with the components of other nodes responsible for handling the given segment. Moreover, the mapping of segments to components may differ across nodes, thereby allowing for scaled-up (or scaled-down) deployments, e.g., by allowing nodes to employ a different number of resources in handling the overall amount of transaction data.

In an alternative embodiment, the details of the segmentation may remain strictly a node internal attribute. In such an embodiment, the mapping of segments to the components of a node may be arbitrary. This alternative allows greater independence in the configuration of nodes, but it generally requires more granular (e.g., transaction-by-transaction) exchange of data between nodes involving some form of transaction layer routing inside the nodes.

As used herein, the term segmentation is used to mean any grouping, partitioning, sharding, etc. of transaction data, whether implicit or explicit, such that the elements of one node may interact with elements in another node to exchange data for more than one transaction at a time.

A header 204 includes several required elements, namely, a hash 210 of the previous block header, a Merkle root 208 of the block's contents, and a proof 206 indicating that a miner of the block in fact was a legitimate miner. Other information may be included.

Blockchain Segmentation

Figure 3:
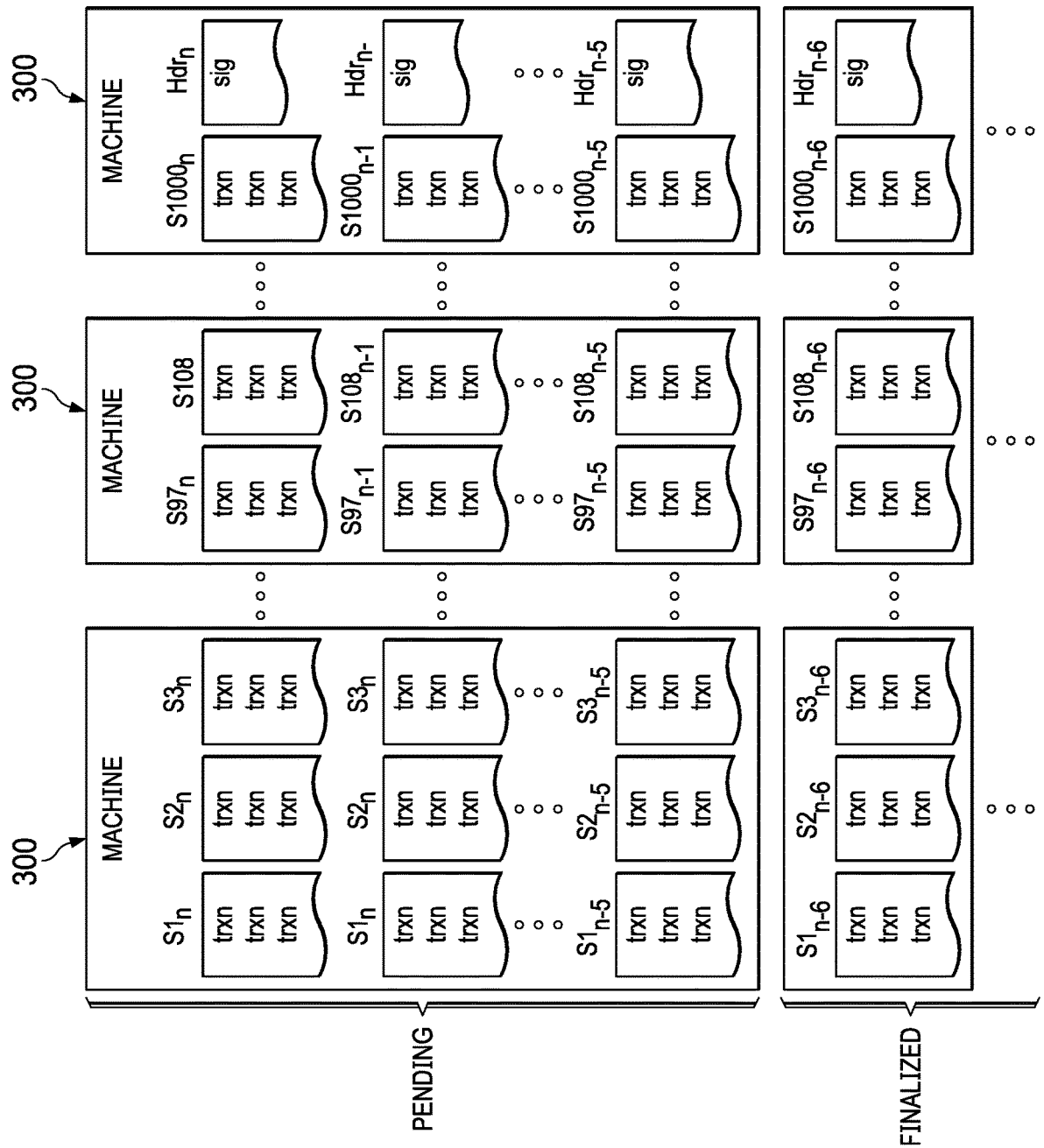
FIG. 3 depicts a segmented blockchain.

Referring to FIG. 3, the segmented blocks form, temporally, a segmented blockchain, with some blocks thereof pending (i.e., not yet finalized), while other blocks thereof are finalized (i.e., added to the blockchain). In this example, each machine 300 as depicted supports both pending and finalized blocks, although this is not a requirement. This distributed organization is not limited to a block "chain," as the approach may also be applicable in other scenarios, such as with respect to a block tree or block graph structure. The approach is advantageous because the blocks are still whole but the segments thereof are processed more efficiently than processing a block monolithically. As depicted in FIG. 3, a varying number of segments may be assigned to different machine resources and commingled. This type of organization is particularly applicable to virtualized and containerized environments, although neither are required to achieve the benefits.

Figure 4:
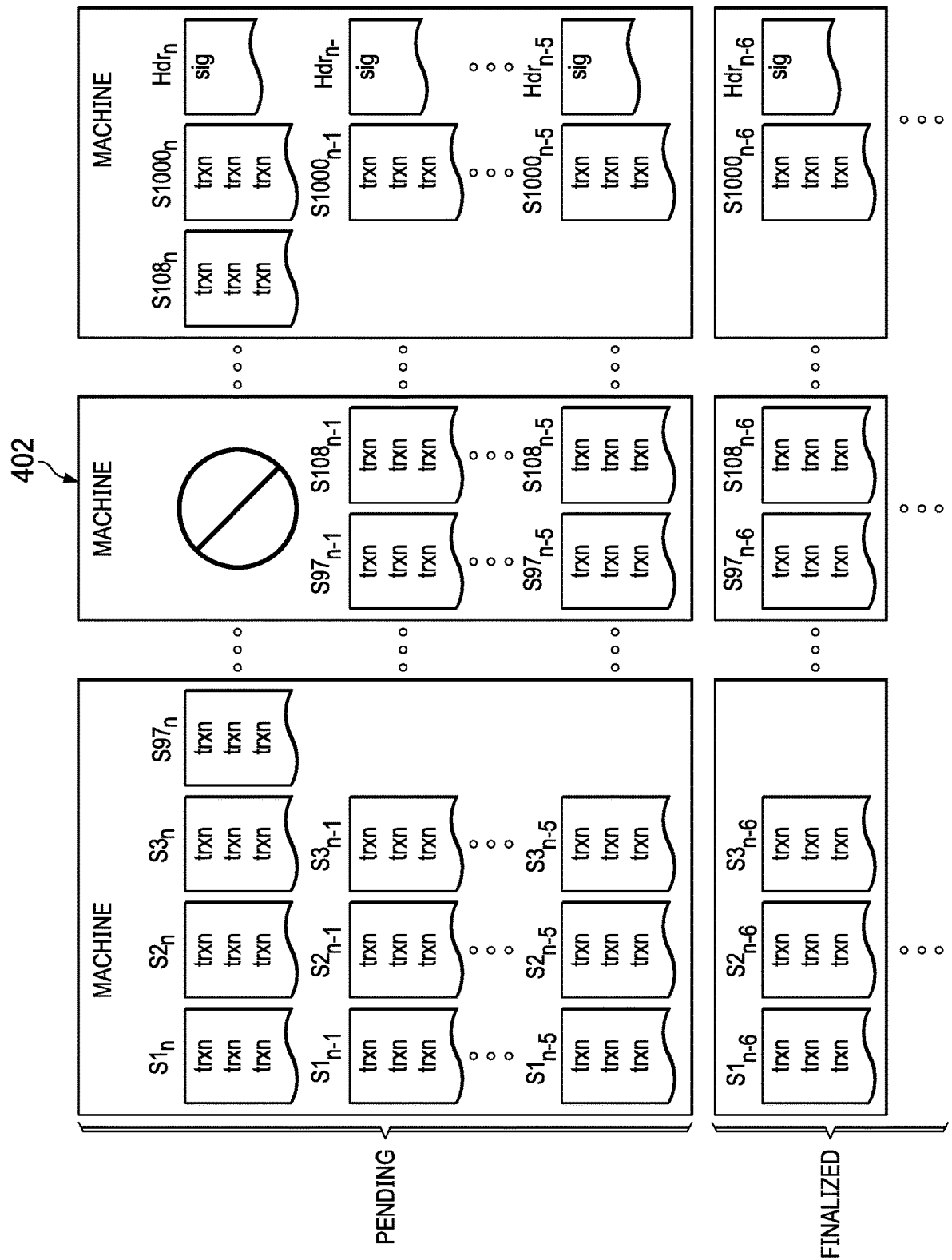
FIG. 4 depicts a segment migration and reassignment process.

Referring to FIG. 4, the assignment of segments to system resources may vary over time, for example, to support upgrades, maintenance and failure recovery. In this case, one machine 402 failed or was taken off line, and the segments it was handling are then migrated to other machines. This approach fits well with established concepts of migrating virtual or containerized computing elements both for routine and emergent reasons.

Segmentation and Inter-Node Communication

Figure 5:
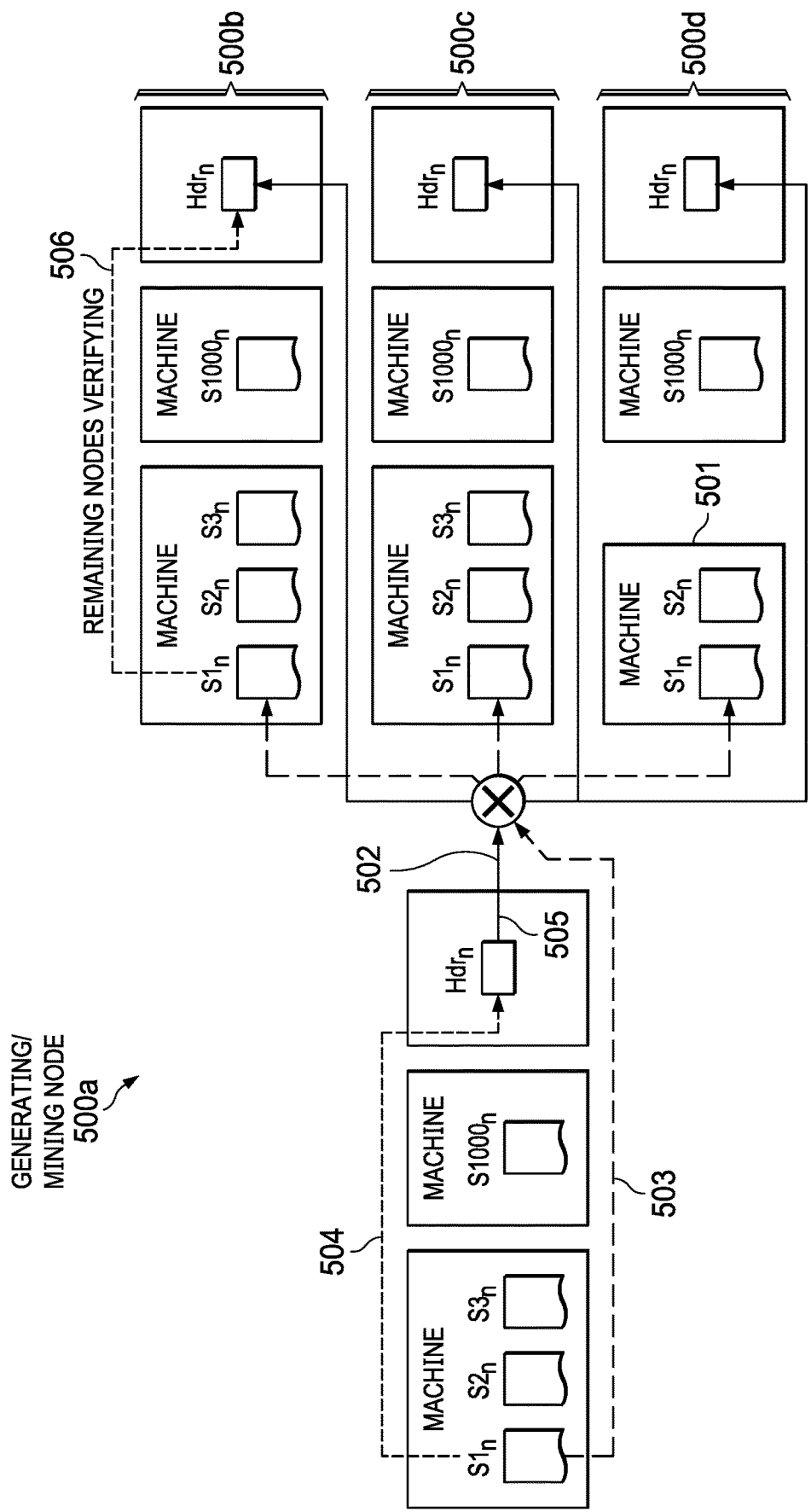
FIG. 5 depicts an inter-node segment handling process of this disclosure.

Referring to FIG. 5, by making segmentation a publicized attribute of a node, elements within a node may communicate directly with elements in other nodes to exchange information on the granularity of a segment. The mapping of segments to nodes need not be the same across all nodes.

As will be described, in a preferred embodiment the computing nodes of the system are each capable of performing (and often do perform) multiple distinct functions or modes (operating roles) such as transaction validation, as well as block mining and verification. Indeed, a given computing node often operates in multiple such modes at the same time. In a typical operating scenario, particular nodes may be used for mining, although typically all computing nodes verify what is mined.

FIG. 5 illustrates how orchestration of block mining and block verification preferably is accomplished in the presence of segmentation. In this example, it is assumed that there are a number of machines that are used for generating/mining the block in the computing node 500a, while other computing nodes 500b, 500c and 500d comprise machines that verify the block (referred to herein as "verification"). As depicted, a block mining event is initiated by message 502 sent by a mining node 500a (generally by the element that handles the generation and validation block headers) to the other nodes of the network (in this example, nodes 500b, 500c and 500d) informing them that it is about to begin mining or generating a block. Corresponding elements in nodes 500b, 500c and 500d receive this message and inform their node's processing elements to expect mined block data from elements in the mining node. At the same time, multiple sequences of messages like 503 are sent for each generated segment by the elements in the mining node handling those segments to the elements handling each segment in remote verification nodes (respectively).

Once a mined segment is finished, message 504 is sent from the element responsible for that segment to the element responsible for the block header. The message includes, among other things, the Merkle root of the generated segment. Once all messages 504 are sent and received, the element responsible for the block header creates the top of the block Merkle tree and saves the Merkle root in the header. It then transmits messages 505 to the elements in the other nodes responsible for handling header generation and verification. In performing validation, and upon receiving messages 503 for a segment, the receiving node element handling the segment validates the received transactions, computes the segment's Merkle tree, and upon completion sends message 506 to the element in the node handling the header. That element reconstructs the block header from the messages 506 for all segments and compares it to the header received from the mining node in message 505. If the headers match, the block is accepted and added to the set of pre-finalized blocks in that node.

In one embodiment, if the transactions fail to verify or the reconstructed header does not match the header transmitted from the mining node, the block is rejected, and all changes are reverted and expunged from the node.

In another embodiment, validating nodes can flag machines that mine to a different value of message 506 for the same segment, thereby safeguarding the system from one or more faulty or malicious machines.

The above-described processing is described in more detail below.

Segmentation and Node Orchestration

Figure 6A:
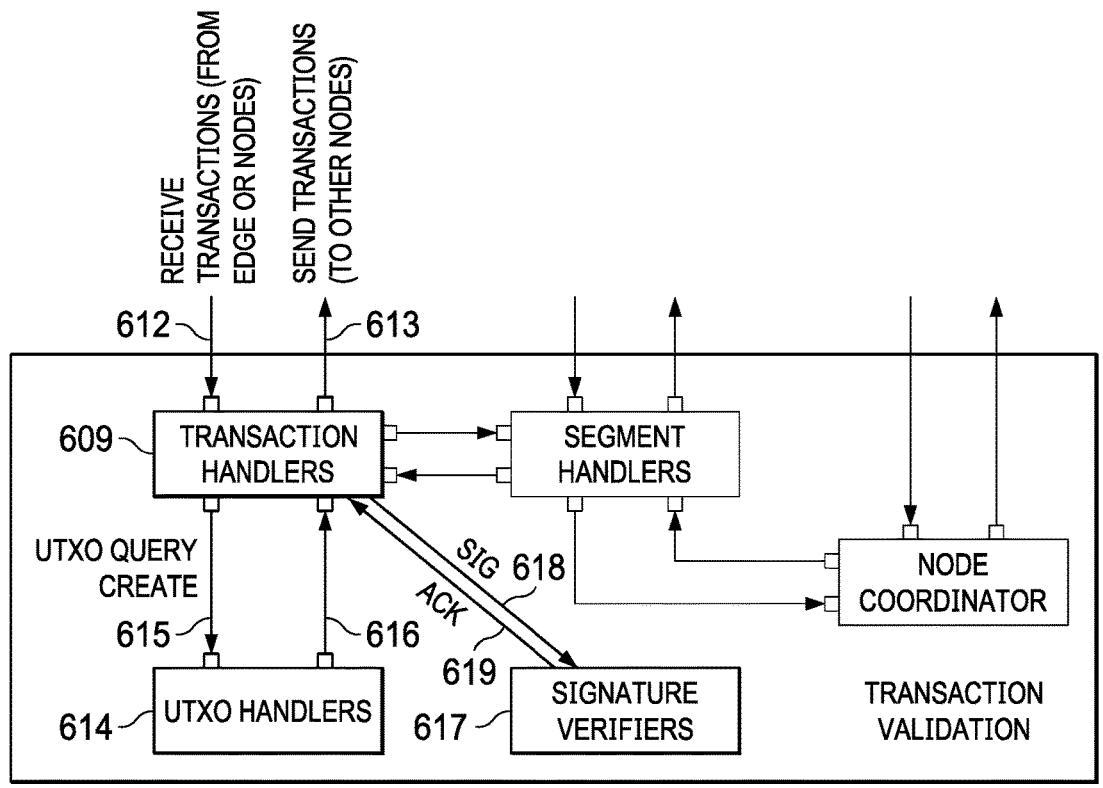
FIG. 6A depicts a representative computing node block diagram and its operation while performing transaction validation.
Figure 6B:
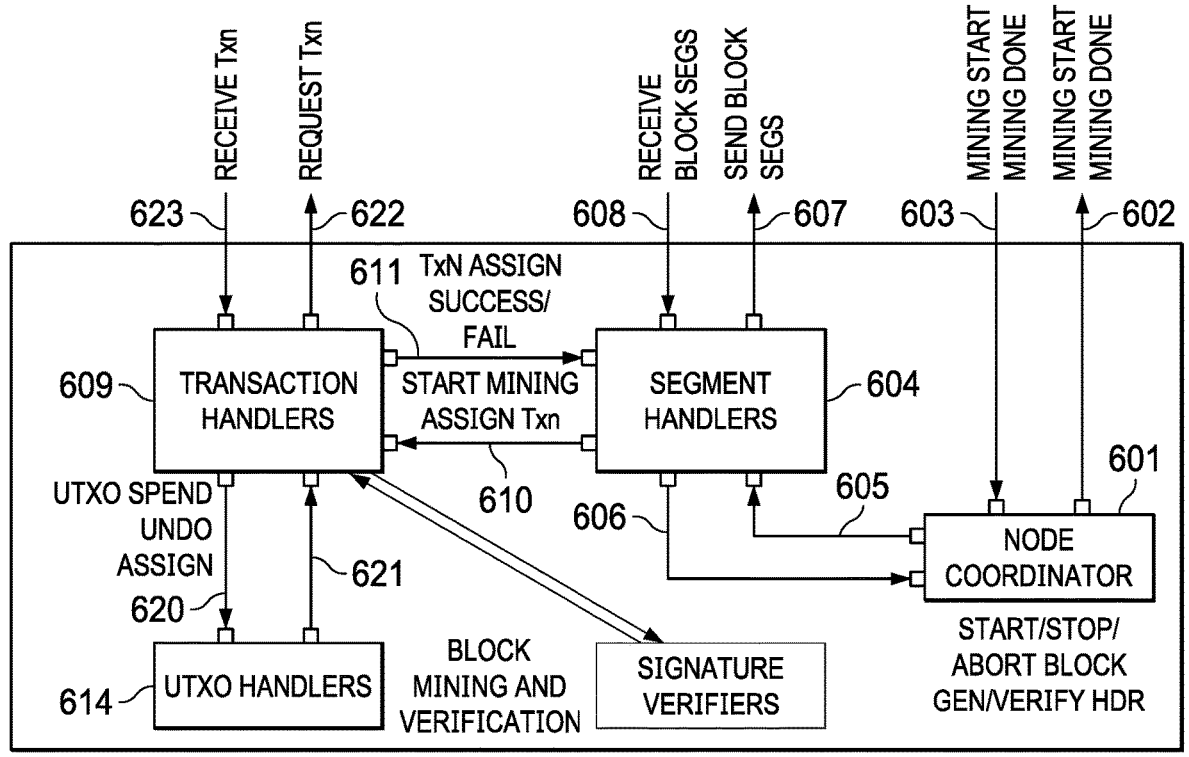
FIG. 6B depicts the computing node of FIG. 6A and its operation while performing block mining and verification.

FIG. 6A and FIG. 6B depict the operation of a computing node of the system, with FIG. 6A showing the operation of the node elements involved with initial transaction validation, and FIG. 6B showing the operation of the node elements involved with block mining and verification.

As depicted in FIGS. 6A and 6B, a node comprises several elements or components that work together to perform separately scalable tasks associated with transaction validation as well as block mining and verification. These components include node coordinator 601, a set of segment handlers 604, a set of transaction handlers 609, a set of UTXO (Unspent Transaction Output) handlers 614, and a set of signature verifiers 617. While segment and transaction handlers are shown as distinct (and this is preferred), these functions can be combined into a composite handler that performs both functions as will be described. Further, while typically there are a plurality of instances of each handler, one may suffice depending on its processing capability.

By way of background, and as noted above, preferably each node is functionally-equivalent to all other nodes in the system, and each node carries the entire load of the system. More generally, all nodes in the system are considered to be equal to one another and no individual node, standing alone, is deemed trustworthy. Further, with respect to one another, the nodes operate autonomously, and no node can control another node.

A node operates in general as follows. For transaction validation, and with reference to FIG. 6A, raw transactions are continuously received at the node at 612, typically as those transactions are forwarded from the edge machines (or from other nodes), and initially processed by the transaction handlers 609. A transaction typically is formulated in a wallet or a set of wallets (e.g., by a wallet service associated therewith or running thereon), and the wallet typically interacts with an edge machine either to receive a transaction request from the periphery or to forward a blockchain transaction to the core, where it is received at 612 and processed by a transaction handler 609. In general, the processing of a raw transaction by a transaction handler is a "validation," and once a raw transaction is "validated" by the transaction handler, the transaction is placed in the transaction handler's memory pool (or "mem pool"). A raw transaction that is not found by the transaction handler to be valid is rejected and not placed in the handler's mem pool.

To this end, upon receipt (i.e. ingress of a raw transaction to the node), the transaction handler 609 typically carries out two basic actions. As depicted in FIG. 6A, the transaction handler 609 queries UTXO handlers 614 (at 615) to determine whether inputs to the transaction exist and, if so, to obtain those inputs (at 616) from the UTXO space being managed by the UTXO handlers 614. If the inputs do not exist, the UTXO handler that receives the query informs the transaction handler, which then rejects the raw transaction. Upon receipt of inputs from the UTXO handler 614, the transaction handler 609 consults a signature verifier 617 (at 618) to determine whether a unlocking script (digital signature) associated with each input is valid. Typically, each input contains an unlocking script (digital signature) of the transaction, and thus the signature verification performed by a signature verifier involves the signature verifier checking that the signature matches the locking script (pubic key) associated with each UTXO consumed by the transaction. Further details regarding this operation are described below. This check thus involves a cryptographic operation and is computationally-intensive; thus, the signature verifier preferably is only consulted by the transaction hander for a valid input received from the UTXO handler. The signature verifier 617 acknowledges the validity of the input (in particular, the input signature) at 619. The transaction handler can interact with the UTXO handler and the signature verifier concurrently as inputs are received by the transaction handler. Once all input signatures are verified by the signature verifier 617, the raw transaction is considered by the transaction handler to the "valid" or "validated," and at 615 transaction handler 609 creates new transactions outputs (UTXOs) in the UTXO handler 614 responsible for UTXOs associated with the new transaction. In this operation, a create request is sent to only one UTXO handler, namely the one handler that handles UTXOs in the portion of the transaction id space associated with the transaction. As also depicted, the create call (at 615) is sent (after a query and signature verifier success) to initiate the new transactions outputs (UTXOs).

Once all inputs are verified in this manner, the raw transaction is then placed in the transaction handler's mem pool. The raw transaction (that has now been validated) is then output (i.e. propagated) to all other nodes via 613, and each other node that receives the raw transaction carries out a similar set of operations as has been just described. This completes the local validate operation for the raw transaction, which as a consequence is now in the transaction handler's mem pool. The above-described process continues as raw transactions are received at the node (once again, either from edge machines or from other nodes).

Thus, a transaction handler that receives a raw transaction determines (from querying the UTXO handler) whether inputs to the transaction exists and, if so, what are their values and locking scripts (containing public keys sometimes referred to as addresses or wallet addresses). It checks each input's unlocking script (digital signature), and if all signatures are valid, the transaction handler commits (saves) the raw transaction to its associated memory pool. In this manner, validated raw transactions accumulate in each handler's mem pool. Thus, in each transaction handler's mem pool there are a collection of transactions in effect "waiting" to be mined (i.e., assigned) to a block segment (and thus a block) in the blockchain. Preferably, the system enforces a minimum wait time to allow the new transactions to propagate and be validated by the other nodes of the system.

Assume now that the node coordinator 601 determines it is time to mine a block into the blockchain. The notion of mining a block is distinct from the notion of actually adding the block to the blockchain, which happens (as will be described in more detail below) when the node coordinator decides a block is final according to a prescribed consensus algorithm of the system. Typically, at any given time there is a subset of the nodes that act as "miners." According to the techniques herein, and as has been described, in lieu of mining a block as a composite, a block is mined in "segments," i.e., individual segments of the block are mined separately (albeit concurrently or in parallel) and, in particular, by the segment handlers 604.

To this end, and with reference now to FIG. 6B, the node coordinator 601 instructs its associated segment handlers 604 to begin mining their segments via 605. This command typically includes a start time, a duration, and an end time. The node coordinator also informs other node coordinators in the system (via 602) to expect mined block segment data to be transmitted directly (via 607) from the mining node's segment handlers to the segment handlers in the other nodes of the system. A segment handler's job is to obtain and receive validated raw transactions from a transaction handler's mem pool, and to stage those validated transactions for eventual persistence in the block segment (and thus the block) if and when the block is finalized and added to the blockchain. In an alternative embodiment, the segment handler may obtain and receive digests (hashes) of validated transactions, in which case the job of staging transactions for future persistence shifts to the transaction handler.

As will be described, preferably the actual persistence of each segment in the block (and the persistence of the block in the blockchain itself) does not occur until the segment handlers are instructed by the node coordinator to finalize a block. Typically, there is a 1:1 relationship between a segment handler 604 and a transaction handler 609, although this is not a limitation. As noted above, these functions may be combined in an implementation and while a 1:1 relationship is depicted, a node could be configured with any number of either type of handler.

Upon receipt of the command to initiate mining, at 610 the segment handler 604 requests the transaction handlers (handling segments for the segment handler) to assign transactions in their respective mem pools to the block and return each raw transaction (or a hash thereof). Before the transaction handler returns a raw transaction from its mem pool to the requesting segment handler, however, the transaction handler must first "spend" the transaction inputs with respect to the block being mined (i.e., apply the actual transaction values to the inputs), which it does by sending spend requests (via 620) to the UTXO handlers; as depicted, the UTXO handlers apply the spend requests, update their local data, and return the result (success or failure) to the transaction handler (via 621).

In the event of a failure response, the transaction handler must instruct the UTXO handlers via 620 to undo all successful spend operations for the transaction. This collision detection and rollback constitutes an optimistic concurrency control mechanism that obviates, and thus avoids the high costs of, acquiring a lock (or a distributed lock in the case of a node with multiple UTXO handlers) on the UTXO handler(s). This enables efficient high throughput, low latency handling of UTXO spend operations.

Upon successfully spending all the transaction inputs, the transaction handler instructs a UTXO handler via 620 to assign the transaction outputs (the transaction's UTXOs) to the block, and it forwards via 611 the raw transaction (and/or a digest thereof) back to the requesting segment handler.

The segment handler-transaction handler interactions here as just described are carried on as the transaction handler(s) continue to receive and process the raw transactions as depicted in FIG. 6A and described above. Referring back to FIG. 6B, the segment handlers 604 operate in parallel with respect to each other, with each segment handler making similar requests to its associated transaction handler. Thus, typically, there is a segment handler-transaction handler pair associated with a particular segment of the block being mined. The transaction handler 609 responds by providing the requesting segment handler 604 with each raw transaction from its mem pool, together with a digest that has been computed for the raw transaction. The segment handler 604 receives each transaction (and its digest) and sequences the transactions into a logical sequence for the segment. Each segment handler operates similarly for the raw transactions that it receives from its associated transaction handler, and thus the segments for the block are mined concurrently (by the segment handlers). As the segment handler sequences the raw transactions, it takes the digests of the transactions and outputs them (preferably just the digests) to all of the other nodes (via 607). The other nodes of the network use the digests propagated from the segment handler(s) to validate the segment that is being mined locally. A segment handler also receives digests from other segment handlers (in other nodes) via 608.

Once a segment handler 604 determines that a segment is valid, it returns the result of its processing, namely, the root of a Merkle tree computed for the segment, to the node coordinator via 606. During mining the node coordinator trusts that the segments are valid. The other segment handlers 604 (operating concurrently) function similarly and return their mining results indicating that their segments likewise complete.

Once all of the segment handlers respond to the node coordinator (with the Merkle roots of all segments), the node coordinator then computes an overall block Merkle tree (from all the segment Merkle roots) and generates a block header incorporating the overall block Merkle root and other information. The node coordinator then transmits/propagates a Mining Done message via 602 containing the block header to the other node coordinators in the network, and those other node coordinators then use the block Merkle root to complete their block verification process as will be described next.

In particular, assume now that the node coordinator 601 receives a Mining Start message via 603 transmitted from the node coordinator of another node initiating its own block mining operation. This begins a block verification process for block data mined and transmitted from the other node. The block verification process is a variation on the block mining process, but the two are distinct and frequently a node will be engaged in both processes simultaneously. Indeed, while a node typically mines only one block at a time, it can be verifying multiple incoming blocks simultaneously. As with mining, according to the techniques herein, and as has been described, in lieu of verifying a block as a composite, preferably a block is verified in "segments," i.e., individual segments of the block are verified separately (albeit concurrently or in parallel) and, in particular, by the segment handlers 604.

To this end, via 605 the node coordinator 601 instructs its associated segment handlers 604 to receive transaction hashes at 608 from other nodes and, in response, to verify the associated transaction block assignments made by the mining node's segment handlers as they mine/assign transactions to a block in the mining process. Preferably, verification of segment data is performed progressively (as the data is received) and concurrently with the mining/assignment of additional transactions to the block segments in the mining node.

Upon receipt of a transaction hash, via 608, a segment handler 604 forwards the transaction hash via 610 to the transaction handler 609 responsible for handling transactions for the segment. Upon receiving a transaction hash from a segment handler, the transaction handler 609 looks up the associated transaction record in its mem pool.

In the event the transaction is missing from the mem pool, transaction handler 609 sends a request (via 622) to receive the missing raw transaction (via 623), preferably from the transaction handler in the mining node responsible for having mined the transaction. This request/response action preferably is handled at high priority in an expedited manner. Upon receiving the missing raw transaction, and prior to resuming verification of the transaction's block assignment, the transaction handler 609 must validate the transaction as described above before adding it to its mem pool.

Upon successfully retrieving the transaction from its mem pool, the transaction handler performs an assignment of the transaction to the block segment being verified just as it assigns transactions to blocks being locally mined as described above; if, however, the assignment fails, verification of the segment and the block of which it is a part fails (i.e., the block is rejected).

Subsequently, the node coordinator, applying a prescribed consensus algorithm, decides to finalize a block. To this end, the node coordinator persists the block header, and it instructs the node's segment handlers to finalize the block. In so doing, the node coordinator provides the overall block Merkle tree to each segment handler. Each segment handler, in turn, persists its set of segments associated with the block, and it instructs its associated transaction handlers to finalize the block. In so doing, the segment handlers generate and provide to the transaction handlers the portion of the block's overall Merkle tree each transaction handler needs for its set of segments. Each transaction handler, in turn, removes the finalized transactions from its active mem pool, and it responds to any outstanding transaction requests it received from the edge (or wallet) for finalized transactions and, in particular, with a Merkle proof derived from the portion of the block's overall Merkle tree the transaction handler received from the segment handlers. The transaction handler then saves the finalized transaction in memory, where it may be used to support subsequent queries that the transaction handler may receive concerning the disposition of a transaction. The transaction handlers then instruct all UTXO handlers to finalize the block. In response, the UTXO handlers mark UTXOs spent in the finalized block as permanently spent, and mark UTXOs assigned to the finalized block as permanently created. Persisting the block header and segments to disk in this manner thus adds the block to the blockchain. Depending on implementation, the block so written to the blockchain may then be considered final (and thus in effect immutable).

Summarizing, in the node processing described above, transaction handlers receive raw transactions, typically from the edge machines. After a transaction handler validates the raw transaction (and places it in its local mem pool), the transaction handler propagates the raw transaction to the appropriate transaction handlers in other nodes that are also responsible for validating that raw transaction. Subsequently, and in response to a determination by the node coordinator to begin mining a block segment, the transaction handler mines (assigns) a set of raw transactions from its mem pool to the block segment, and sends those raw transactions (and their associated digests) to the requesting segment handler that is handling the respective segment. The segment handler sequences the received transactions into the segment and, as it does so, the segment handler forwards the list of digests for the transactions comprising the segment to the other segment handlers responsible for handling those segments in the other miner nodes. Thus, raw transactions propagate across the transaction handlers in all nodes, but segment handlers preferably only send the transaction digests for the segments to be verified. During block segment mining and verification, transaction handers consult their local segment handler(s), which as noted communicate with the segment handlers of other nodes. Transaction handlers in different nodes thus communicate with one another to populate their respective mem pools with transactions that have been validated (using the UTXO and signature-verifiers). The segment handlers (and thus the node coordinator handling the mining) communicate with one another to populate the blockchain with a block comprising the segments. As previously noted, the transaction handlers and segment handlers need not be separate services.

As described above, block verification is similar to block mining, except that for verification the segment handler is feeding transaction hashes to its transactions handlers, which transaction handlers then respond with "valid" (with respect to the raw transaction) or "invalid" (with respect to the entire received block), and the latter response should not happen unless the miner is behaving erroneously or in an adversarial manner. The above-described technique of generating and handling of Merkle trees and roots is the preferred cryptographic mechanism that ties transactions to their block. In verification, and upon completion when the node coordinator gets results from all the segment handlers, the coordinator once again computes the overall block Merkle root, but this time it compares that root with the root provided in the block header sent to it by the mining block coordinator. If they do not match, the block is discarded as invalid.

The terminology used herein is not intended to be limiting. As used herein, the term "validate" is used for the operation that the transaction handler does when it receives a raw transaction to be put in its mem pool. As noted above, to validate a transaction, the transaction handler queries the UTXO handler(s) to check the availability of the referenced UTXOs and talks to the signature-verifier to check signatures (on the inputs). In contrast, the term "verify" is used for the act of verifying the contents of block segments received from other nodes that are likewise performing the consensus initiated by the node coordinator. A transaction validation may also be deemed an "initial transaction verification" as contrasted with the "block segment verification" (what the coordinator and segment handlers do with block segment data received from other nodes) in response to the coordinator initiating a mining operation on the block (comprising the block segments). Also, the term "mine" is sometimes referred to as "assign," meaning what a transaction handler does when it is told by the segment handler to assign or associate a transaction with a block segment, i.e., the transaction handler's verification of the transaction with respect to its inclusion in a block segment by the segment handler. As noted above, to accomplish this, the transaction handler communicates with its UTXO handler to "spend" existing UXTOs, and to "assign" new UTXOs to a block segment.

Also, the notion of a "handler" is not intended to be limited. A handler is sometimes referred to herein as a "coordinator," and the basic operations or functions of a handler may be implemented as a process, a program, an instance, an execution thread, a set of program instructions, or otherwise.

While the above describes a preferred operation, there is no requirement that a handler handle its tasks on a singular basis. Thus, a segment handler can handle some or all of the segments comprising a block. A transaction handler can handle the transactions belonging to a particular, or to more than one (or even all) segments. A UTXO handler may handle some or all partitions in the UTXO space. The term "partition" here is used for convenience to distinguish from a segment, but neither term should be deemed limiting.

The following provides additional details regarding the above-described node components in a preferred implementation.

Node Coordination

Node coordinator 601 participates in a network consensus algorithm to decide whether the node should mine a block or not, and from what other nodes it should expect to receive mined block data. If the node is to mine a block, node coordinator 601 sends messages (via 602) to the other node coordinators in the network. Node coordinator 601 also receives messages (via 603) from other node coordinators in nodes that are mining a block. As has been described, node coordinator 601 informs the node's segment handler 604 in messages (via 605) to start mining block segments and from what other nodes to receive and validate mined block segments. The node's segment handler 604 will return to the node coordinator 601 in a message (via 606) the Merkle root of the transactions comprising each block segment.

Another aspect of node coordination is managing node local representations corresponding to the one or more chain branches that may be active in the network at any given time. Typically, a blockchain consists of a single sequence of blocks up to the point of finalization. Finalization often is set to be some number of blocks deep in the chain, but the decision of what and when to finalize is subject to the rules governing consensus across the network. The part of the blockchain that is pre-finalized consists of potentially multiple branch chains that get resolved before finalization. As indicated above, for example, when multiple nodes mine simultaneously, they fork the blockchain into multiple branches that have some common ancestor block. The node coordinator 601 is responsible for tracking active branches and informing the segment handlers 604 which branch they are mining, if the node is mining, and which branch each remote miner is mining.

Segment Handling

As also described, segment handlers 604 handle the generation and/or validation of some number of block segments representing a portion of block segmentation space. Specifically, the segment handlers begin generating block segments as directed by the node coordinator 601 in messages (via 605). When mining, a segment handler 604 transmits mined block segment data via 607 to segment handlers in the other nodes to be verified. A segment handler 604 receives block segment data in messages (via 608) from segment handlers in mining nodes. To perform transaction mining and validation, a segment handler 604 interacts with an associated set of transaction handlers 609 as also previously described.

Transaction Handling

Transaction handlers 609 handle the validation of transactions to be added to the mem pool and propagated to the network, the generation of transactions to be included in a mined block, and the verification of transactions to be included as part of a block received from a mining node. As noted above, the distribution of the transaction segmentation space may be the same for a transaction handler 609 and a segment handler 604, or it may be different. For example, the computational resources needed by the segment handler function may be sufficiently low that only a few such handlers are used to handle all the block segments, whereas the computational resources required by the transaction handler function might be sufficiently high so as to require that each such handler manage the transactions for a smaller number of segments than their associated segment handler 604.

The transaction handler function plays another important role in the system as also previously described, namely, transaction admissions (also referred to as "validation") and propagation. A transaction handler 609 receives transactions in messages (via 612) from the edge either directly or indirectly via other transaction handlers in the network. The transaction handler 609 validates all received transactions and if valid, saves the transactions to a pool of unprocessed transactions (its mem pool) and optionally propagates the transactions to other nodes in the network in messages (via 613). In this way, the transaction handler function orchestrates the propagation of transaction data such that all nodes receive all incoming transactions and associated incoming transaction digests in a timely and efficient manner.

UTXO Handling

Preferably, UTXOs are identified by an identifier (txid), which is a hash or digest of the originating transaction, and the index of the output in the originating transaction. A UTXO also has two other pieces of information (not used in its identification), namely, a value, and a "locking script." Generally, the locking script is a set of instructions or simply a public key associated with the output. Sometimes the public key is called an address or wallet address. The locking script (e.g., the public key) is conveyed in the output of a transaction along with the value, and typically it is stored in a UTXO database along with the UTXO identifying information and its value. Thus, a query to the UTXO handler during initial transaction validation returns both the value and the locking script (public key). To spend a UTXO as an input to a new transaction, the new transaction (essentially its outputs), must be signed by the private key cryptographically matching the public key of the UTXO to be spent. This signature is provided with each transaction input and is generally called the "unlocking script." The unlocking script can be a set of instructions or simply a digital signature. Thus, the digital signatures bind the output values of the transaction to the locking scripts (public keys) for which the receivers of the values presumably have the corresponding private key (later used to formulate an unlocking script). The signature verifier does not have the private key (as only the wallet or cryptographic element thereof has the private key). The signature verifier receives the public key (from the locking script) and a signature (from the unlocking script), and the signature verifier verifies the signature against the public key, thereby proving the signature was produced by the matching private key. To summarize, a transaction output at a given index has a locking script (public key) and value. A transaction input has the originating txid, index, and an unlocking script (signature).

To handle transactions, and as noted above, the transaction handler interacts with a set of UTXO handlers 614 with messages (via 615 and 620) to create, query, spend, and assign Unspent Transaction Outputs (UTXOs) associated with each transaction. Each UTXO operation may also be reversed using an undo request in messages (via 620). This reversibility is valuable because it allows for a transaction handler 609 to undo the parts of transactions that may have completed successfully when the transaction as a whole fails to complete. Instead of locking UTXO databases to allow concurrency and prevent conflicts, here the system preferably relies on detecting conflicts and reversing UTXO operations for partially complete transactions. Conflicts in this context include, but are not limited to, an attempt to spend a UTXO before it exists or is finalized (as policy may dictate), spending a UTXO that has already been spent by another transaction, or any other UTXO operation failure that renders the transaction incomplete.

As noted above, each UTXO has a value and an locking script that must be executed successfully for the transaction to validate. The script is a set of instructions that must be executed to lock the use of a UTXO as an input to another transaction. Commonly, the script contains public key material that corresponds to the private key that must be used to sign transactions that consume the UTXO as an input.

Because the number of UTXOs that accumulate can grow large, the UTXO space preferably is also partitioned by transaction identifier in a manner similar to how blocks are segmented by transaction identifier, although preferably the partitioning and segmentation spaces are divided according the needs of each independently. While UTXO handling could be performed by the transaction handlers that produce the UTXOs, preferably the handling of UTXOs is separated out from transaction handling for two reasons: (1) because the resource demands are different, and (2) because isolating the transaction handler function enables the transaction and UTXO handlers to perform more efficiently. Preferably, the UTXO space also is partitioned to make more efficient use of a node's aggregate memory and storage resources. By applying this segmentation (namely, through the transaction segmentation space), a highly scalable and timing-constrained solution is provided.

Signature Verification

The final element in the block diagram in FIG. 6A is the signature verifier function provided by a set of signature verifiers 617. As noted above, preferably transactions are signed by the set of private keys associated with the transaction's inputs. The most compute intensive task in a node is verifying the signatures of a transaction. Consequently, significant computational resources preferably are dedicated to signature verification. Each signature verifier 617 preferably harnesses the computational resources necessary to support a portion of the signature verification load, and the transaction handler function disperses the signature verification load across the available set of signature verifiers 617 using messages (via 618) to send the data to be validated, and in return receiving acknowledgement or negative acknowledgement in messages (via 619). In one embodiment, these operations are carried out by combining signature verification with some other processing (e.g., transaction handling). In another embodiment, and as depicted and described, to allow for greater scalability, the processing demand is accommodated by enabling signature verifiers 617 separate from other elements.

Pipelined Block Generation, Transmission, and Verification

Figure 7:
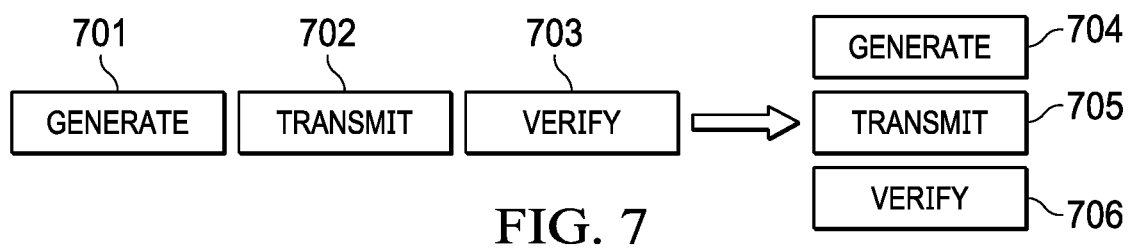
FIG. 7 is a high level depiction of a concurrent processing technique of this disclosure.

Referring to FIG. 7, traditional blockchain based systems serialize the generation (mining), transmission, and verification of blocks. In such systems, a block is generated 701 by a miner; once the block is finished being generated, it is transmitted 702 to other nodes for verification, and once nodes finish receiving a block, they begin to verify 703 the block. Such serial-based processing is inefficient and does not scale, especially in the operating context previously described, namely, wherein transaction messages are being generated across a potentially global-based network.

When attempting to build a system with high performance requirements, e.g., such as being capable of processing millions of real-time transactions per second, such current implementation approaches are entirely inadequate. For this reason, in the approach herein (and as described above), preferably these processing stages are pipelined for concurrency. Thus, according to the techniques herein, while a miner generates 704 block data, previously-generated block data is transmitted 705 to nodes for verification. The verifying nodes receive the mined block data and begin verifying 706 the block's transactions before receiving the complete block and likely long before the miner has finished mining the block.

It should be appreciated that in accordance with FIG. 5, the pipeline of block generation, transmission and verification also is instantiated for each segment of a block and that, as such, block segments are operated on in parallel. The result is greater concurrency through the combination of parallel and pipeline processing.

Streaming Block Generation, Transmission, and Validation

Figure 8:
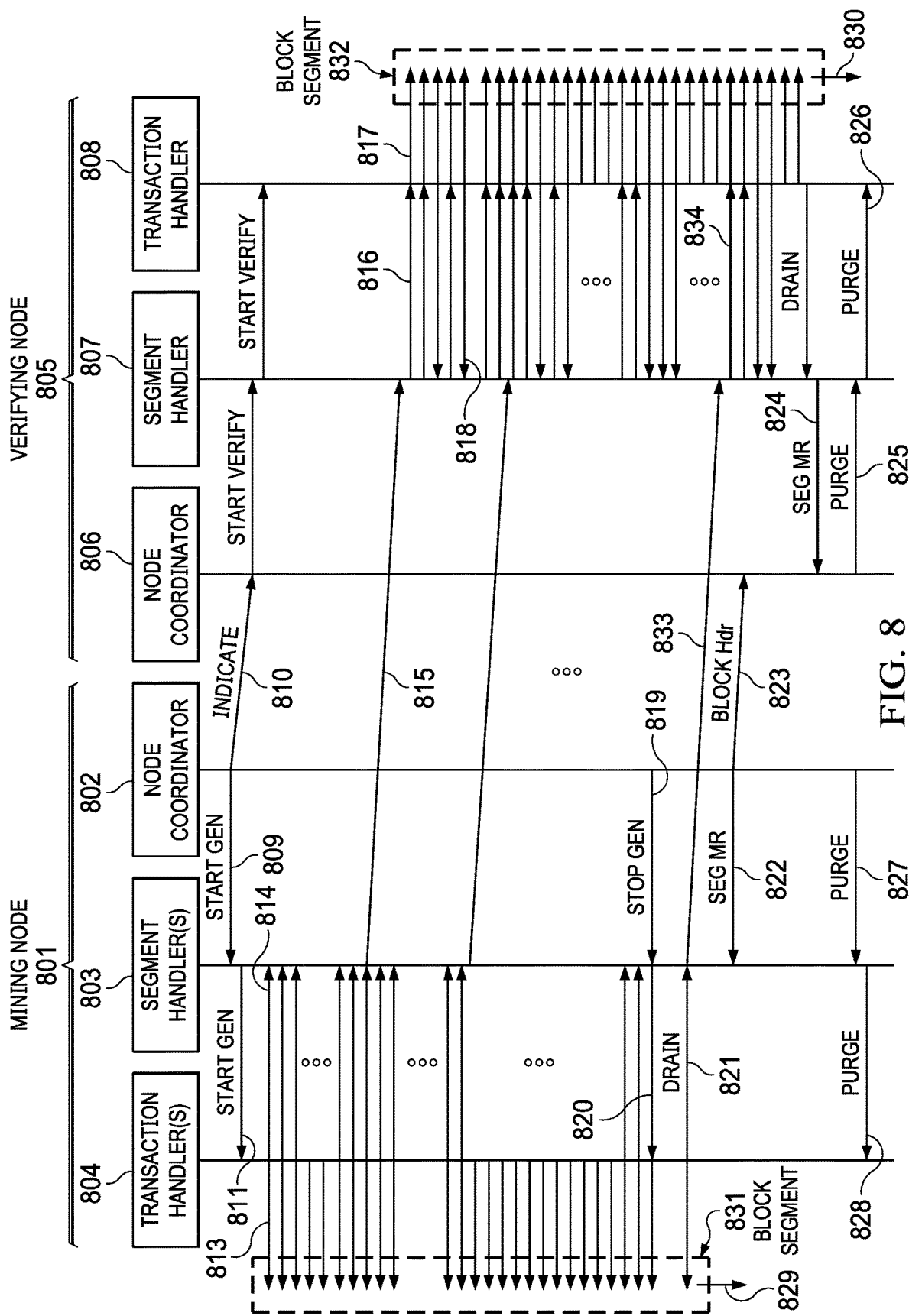
FIG. 8 is a detailed depiction of the operations that are carried out among various nodes and node elements to provide streaming block generation, transmission and validation according to this disclosure.

Referring to FIG. 8, to support pipelined block generation, transmission and verification a streamed block segment generation, transmission and verification process is shown between two nodes, namely: miner node 801 and verifying node 805. Although one verifying node 805 is shown, as described above typically all nodes in the network verify the mined block. As has also been described, this process also typically runs concurrently with the same process for other block segments being mined by miner node 801. As noted, there may be multiple miner nodes 801 and multiple streamed generation, transmission and validation processes operating in the network concurrently. Note that in this example, the responsibility of staging a segment for persistence is associated with the transaction handlers as opposed to the segment handlers, as described previously.

Generation

As shown in FIG. 8, the process starts when mining node coordinator 802 meets the criteria for mining a block on the network. In one embodiment, this criterion could be a probability condition that the miner can prove it meets (e.g., a trusted or otherwise verifiable random number below some threshold). Any criteria for miner selection (leader election) may be applied. Node coordinator 802 sends messages 809 to request that mining node segment handler 803 start generating block segments. Node coordinator 802 also sends messages 810 indicating to the validating node's coordinator 806 to expect mined block segments from the miner node's segment handler 803. Each mining segment handler 803 sends message 811 to their associated transaction handler(s) 804 indicating that transaction handler(s) 804 start assigning transactions from a pool of collected raw transactions associated with each transaction handler 804 to a block. Transaction handler 804 repeatedly inspects unprocessed transactions (transactions that have not previously been assigned to the block or any ancestor thereof) that it received from the edge (directly or via transaction handlers in other nodes). It should be appreciated that some aspects of transaction verification (transaction validation as described above) may be done in advance when the transaction is first received. For each verified transaction assignment, transaction handler 804 (1) adds the full transaction record 813 to block segment 831, and (2) sends message 814 containing a digest (e.g., a hash) in a stream to segment handler(s) 803.

Transmission

Segment handler 803 collects one or more transaction digests from the stream of messages 814 and sends the transaction digests in a stream of messages 815 to the segment handler 807 in each validating node 805 responsible for validating the generated segment data. As shown, the number of messages in the stream of messages 814 may differ from the number of messages in the stream of messages 815, though the total number of transaction digests transmitted in both streams typically will be the same.

In validating node 805, segment handler 807 receives a stream of messages 815, extracts the transaction digests, and sends one or more messages 816 to transaction handler 808. The number of messages comprising the streams of messages 815 and 816 may differ. In this embodiment, transmitted message 810, stream of messages 815 ending with message 833, and message 823, may be transmitted unicast or multicast, directly from node element to node element, indirectly propagated through elements in other nodes, or routed or forwarded through network elements. The data may travel aggregated or separated.

Verification

Verifying transaction handler 808 receives the transaction digests and lookups unprocessed transactions it has received from the edge (directly of via transaction coordinator in other nodes). If the lookup is successful, it verifies the transaction assignment. Upon successful verification, transaction handler 808 (1) sends verification acknowledgements in messages 818 to segment handler 807, and (2) adds the full transaction record 817 to block segment 832.

End of Stream Handling

In one embodiment, the streaming generation, transmission, and verification process ends when mining node coordinator 802 sends a stop generation message 819 to all mining segment handlers 803. In this scenario, nodes are assumed to be running asynchronously, and with no explicit time boundary between execution rounds. In another embodiment, nodes may run in a synchronous manner, and the process would end when a specific time is reached.

When the process ends, each segment handler 803 sends a stop generation message 820 to its associated transaction handler 804. Each transaction handler 804 finishes or aborts any transaction assignments that are still in progress and acknowledges that it has stopped mining along with any remaining assigned transactions included in the block segment in message 821 to segment handler 803.

Segment handler 803 sends any unsent transaction hashes and an end-of-stream indication in message 833 to validating node's segment handler 807. Each segment handler 803 computes a Merkle tree from the transaction hashes of each segment and sends the Merkle tree root (Merkle root or MR) to the node coordinator 802 in message 822. When the node coordinator 802 receives a Merkle root for all segments of the block, it computes the top of the Merkle tree for the overall block from the segment Merkle roots and generates a block header composed a hash of the previous block header, its mining proof, and the overall block Merkle root, and other data. On failure, node coordinator 802 send purge message 827 to each segment handler 803 which in turn sends a purge message 828 to its associated transaction handler(s) 804 that then discards the block segment. On success, node coordinator 802 sends the block header in messages 823 to all validating node coordinators 806.

When each verifying node's segment handlers 807 receives end-of-stream indications in messages 833, they in turn send to their associated transaction handlers 808 messages 834 indicating the end-of-stream verification. When each segment handler 807 has received acknowledgements for all outstanding transaction assignment verifications from its associated transaction coordinator 808, it computes the Merkle trees for its segments and sends the Merkle root for each segment in messages 824 to verifying node coordinator 806. When verifying node coordinator receives Merkle roots for each segment, it generates a block header, and verifies that the block header it generates matches the block header it received in message 823. If the block header does not match, it sends purge message 825 to each validating segment handler 807 which, in turn, sends purge message 826 to its associated transaction handler(s) 808 that then discards the block segment.

Finalizing a Block

As noted above, in the above-described system a block is not persisted until it is finalized. Preferably, the block is not finalized until the node coordinator concludes that is should be finalized based on having adhered to a prescribed consensus algorithm. In contrast, preferably at the conclusion of mining, a block is not persisted. Rather, after mining, a block is simply tracked until it is either finalized (per the consensus algorithm) or thrown away (purged), in the latter case because it did not survive the application of the consensus algorithm.

Thus, and as described, the approach herein leverages a high-quality, low-latency, highly-interconnected core network (the mesh) in conjunction with block segmentation and other above-described features (e.g., topology-aware data propagation, non-blocking architecture, optimistic concurrency control, partitioning, multicast and the other features) to provide a computationally-efficient transaction processing system, all without any central transaction routing or switching (e.g., a Layer 7 switch that needs to account for an route large numbers of transactions). Preferably, the architecture is used in conjunction with a global CDN network to provide global reach, and this approach advantageously enables CDN mapping technologies to be conveniently leveraged (e.g., by clients and other transaction services) to discover and interact with the computing elements in the core network.

Cryptographic Server Support

Another aspect of a distributed system of record as has been described involves constructing a permissioned network environment that enables high performance, as well as the high level of safety, security, and trust necessary for use in commercial applications. Unlike the non-permissioned open Internet, various elements of the system preferably rely on Public Key Infrastructure (PKI), for example, to establish chains of trust, trust boundaries, secure administrative features, as well as driving certain aspects of consensus, leader election, fork prevention and suppression, and so forth.

As described above, in the above-described overlay network-based design, the peripheral, edge and core elements preferably communicate with one another via mutually-authenticated encrypted connections. In this environment, it is desirable to prevent exfiltration and exploitation of the keys used to establish such connections. Further, and as also described, computing nodes in the core network typically have one or more public/private key pairs that are used to validate the authenticity of nodes that are generating (mining) a block. Further, nodes that are validating generated blocks typically use their keys to endorse the validity of a block by signing it. In a typical operating environment, public/private key pairs are also used to create a random number sequence that is in turn used to select miners and/or potentially to select a subset of miners and prune multiple pre-finalized chains. In all of these cases, any compromise of private keys creates potential security concerns. Moreover, and with respect to a consensus-based core network (such as has been described above), correctness is assured with up to some number of compromised nodes; thus, protecting private keys and verifying the data enabling their use provides defense-in-depth and mitigation against widespread network compromise. Indeed, for trusted computing environments involving wallets, protecting the private keys and verifying the data enabling their use (as will be described below) provides a first line of defense against both physical- and network-based compromises. To mitigate the risk of key compromise, preferably a secure server-based technology (sometimes referred to herein as "cryptoserver" (CS)) is used to equip the various parts of the distributed system of record with one or more cryptographic support services (or "crypto service") such that private keys and the logic enabling their use are segregated from periphery, edge and core service execution environments. By design, a crypto service provides a high security profile specifically used to keeping private keys private and safe from exploitation.

Thus, in one aspect, the a crypto service such as described may be used to protect wallet private keys. For example, a transaction may start of with a payee wallet providing to a payer wallet an amount together with a public key. The payer wallet does not possess the private key. Instead, preferably the payee wallet possesses an information associated with a private key, which is maintained by the crypto service. In response, the payer wallet sends a request to the crypto service, preferably using secure and mutually-authenticated communications. The request preferably contains data including information associated with the private key, together with the transaction data (or a digest or hash of the transaction data) to be signed. The crypto service verifies the transaction data and associated private key information and performs the signature over the provided data (or a portion thereof), and it returns the signature in response. The signed transaction is added to the system of record. In a representative use case, the data sent from the payee wallet to the payer wallet could be any data including, without limitation, a legacy ISO-8583 message, other payment or transaction API message new or extant, pass codes, pins, and so forth. An advantage of this approach is that while the interfaces to the payer wallet may be public and evolving, the interface between the payer wallet and the crypto service remains private and stable, making it far less vulnerable as an attack surface. A further advantage of using the crypto service is that it enables the data provided to the payer wallet to be used to construct transactions to be posted to the ledger; moreover, with both the original data and the constructed transaction sent to the crypto service, the approach enables verification (by the crypto service) of the original data, as well as verification that the constructed transaction is a correct representation thereof.

There are many variants in the above arrangement. For example, the crypto service may be accessible via a network, but it may also reside on the same machine or device in a segregated and protected (and possibly encrypted) memory space such as a secure enclave. Further, a single crypto service, or as small set of crypto service(s) may be used to protect the keys of multiple (and potentially a large number of) wallets.

The crypto service may also be used to protect private keys used for block generation (mining) and validation. In this aspect, block generation and validation activities are augmented with Public Key Infrastructure (PKI), such that blocks are not simply validated by their content, but they are also validated by the authenticity of the mining node. Thus, for example, assume that a miner is generating a block (or portion thereof) as has been described. As noted, typically the header for a block includes a variety of information, such as a hash of the previous block upon which the block depends. In addition to the usual information included in a block header, the system can require that the block be signed by the node that mines it. In such context, it is important that the private key or keys used for such purposes remain secure. To this end, a crypto service mitigates the risk of private key exfiltration and exploitation by keeping such keys segregated from application and service logic. In this context, the material being verified and signed by the miner could be anything including, without limitation, block attributes, any other data contained in the block, the state of the system at the time of generation, the signature contained in the previously-mined block, and so forth.

Preferably, trusted computing environments are used to provide the crypto service(s). In one implementation embodiment, a crypto service (or crypto server) typically comprises a networked security appliance attached to each transaction network server (e.g., a wallet services multi-wallet processor) that interoperates seamlessly with a key management system associated with the transaction network.

A representative crypto service is as described in U.S. Pat. No. 9,647,835, the disclosure of which is incorporated herein by reference. As described there, a representative server-side (the crypto server (CS)) process runs in an execution environment that has physical security and that is distinct from the execution environment of an overlay network edge server. A crypto server daemon is responsible for managing incoming requests from the network reporting load, and generating log and related information. The secrets (e.g., private keys) protected by this trusted computing environment are maintained secure, e.g., by being stored in trusted hardware that is only accessible by the daemon. A trusted computing environment of this type may leverage Hardware Security Modules ("HSMs" or enclaves), such as supported by Intel® SGX (Software Guard Extensions) or attached preferably programmable HSMs. In a representative embodiment, a crypto service executes in a caged network setup, with private keys (or other secrets) protected by an enclave. An enclave typically is statically-compiled and requires BIOS and kernel support, and preferably an enclave does not and cannot interact with any hardware or software that is not co-located (on-die). Although the above-described components are preferred, any memory-encrypted trusted computing element may be used for these purposes.

Crypto service(s) may comprise a network-based service that includes hundreds or even thousands of crypto servers, each handling large numbers of transactions. Preferably, a computing node of the system has associated therewith a trusted computing environment as described. More generally, secure (trusted) services are built on top of components, even in the operating scenario (as described) where no one or even a small set of components are themselves trusted. In particular, and as described, the computing nodes of a blockchain network do not need to trust one another, and in general, wallets do not trust the ledger in so far as they require cryptographic proof that the ledger is valid and that transactions are on the ledger. Preferably, transactions on the ledger are signed individually for each transaction input and are therefore self-verifiable; in other words, the ledger can be trusted without necessarily trusting the computing nodes that provide the ledger services.

Consensus

A blockchain consensus process relies as mining, which as referenced above is the act of generating an ordered block of transactions, typically with a header that references a previous block in the blockchain. As also previously noted, in transaction and financial processing systems, random numbers often are used for subcommittee election, leader election, or miner selection. A random oracle may be used to generate the random numbers, and these numbers should be not foreseeable (i.e., predictable), not capable of being manipulated (i.e., influenced), and not forgeable (i.e., they are verifiable). As also noted, a random oracle may be based on algorithmic, verifiable and/or deterministic pseudorandom numbers.

By way of additional background, leader election and miner selection are activities performed at prescribed times. In a blockchain system, example scenarios include, but are not limited to, periodic intervals, system initialization, system or component error and failure recovery, and start/stop block generation events.

The distributed system of record described herein provides for a permissioned, highly-secure computing environment comprising a set of computing nodes. For mining, a mining proof is data presented by a computing node that mathematically proves the node is a legitimate miner of a block or portion thereof. The data preferably is recorded in a block header such that proper blockchain construction (namely, trust), is self-verifiable. According to this disclosure, mining proof is provided, preferably using some available source of trusted random numbers. In this approach, preferably a node uses a memory-encrypted trusted computing element to generate real random numbers to facilitate producing mining proofs that exhibit the properties desired.

Key Management

The following is a glossary of terms used herein.

A blockchain is an append-only immutable chain of data blocks, wherein the presence of a transaction recorded within a block, and a block within the chain, are verifiable via cryptographic hashes. A block is a collection of transactions. It contains a cryptographic hash linking it to a previous block, forming a chain. Multiple blocks can be linked to a previous block, but only one finalized block can be linked to a previous block.

A merchant is an entity that executes a trade of goods or services for payment. A merchant has a bank account that is managed by an acquiring bank, and typically it maintains point-of-sale terminals (or other legacy infrastructure) responsible for generating valid payment requests. More generally, a point-of-sale terminal is a type of merchant connector (MER) that generates payment requests.

A wallet is a collection of private-public key pairs and reference to unspent transaction outputs, which are "stored value," and that are used to create transactions. A "wallet service" typically is a software entity that securely maintains a collection of wallets, proxies requests between external entities and a core network of computing nodes that support the blockchain, and that process the corresponding responses.

A wallet service may utilize a multiple wallet processor (WP) or equivalent processing function.

As described above, an Unspent Transaction Output (UTXO) is an output from a finalized transaction that contains some value and that is associated with an address. UXTOs can be passed as an input (spent) to a transaction that is created by a wallet holding the associated private key. A UXTO can only be spent once.

An acquirer is an institution where a bank account is held. An acquirer typically operates legacy infrastructure that is responsible for authorizing payment requests. This infrastructure is sometimes referred to as a connector for an acquirer or an operator.

A administrative server is a service external to the payment network that provides one or more services, such as clearing, operator and merchant bank processes, regulatory compliance, and the like.

A ledger service (sometimes referred to as "ledger services") is a distributed system that processes transactions and maintain a core ledger. The core ledger is the system of record maintained by the ledger service utilizing the blockchain technology described herein. The core ledger is a distributed system that processes transactions and creates the blockchain.

A payment network is a network that combines wallet services and the blockchain core ledger (ledger service). Wallet services receives client transactions, routes the transactions to a wallet processor (e.g., a WP), applies the necessary payment logic, and then forwards valid transactions to the ledger services. Ledger services, in turn, receives transactions from the wallet services, validates, processes, and records them onto the blockchain-based ledger. Processed transactions, consisting of the original legacy transaction and its corresponding blockchain transaction from ledger services, may be stored in a storage services for long-term persistence. The storage system may be used to respond to historical queries, and to provide backup for disaster recovery. A payment network may also include a data cooperation service to provide an interface to handle administrative traffic. Customer transactions enter the system via wallet services, while administrative requests (wallet updates, data center updates, historical queries, etc.) enter the system via the data cooperation service, which validates requests before forwarding them to the correct service. Preferably, the data cooperation service exposes a set of RESTful application programming interface (API) endpoints and, as a result, supports any client that can make a TLS mutually-authenticated REST-based HTTP request and send data represented by JSON.

Figure 11:
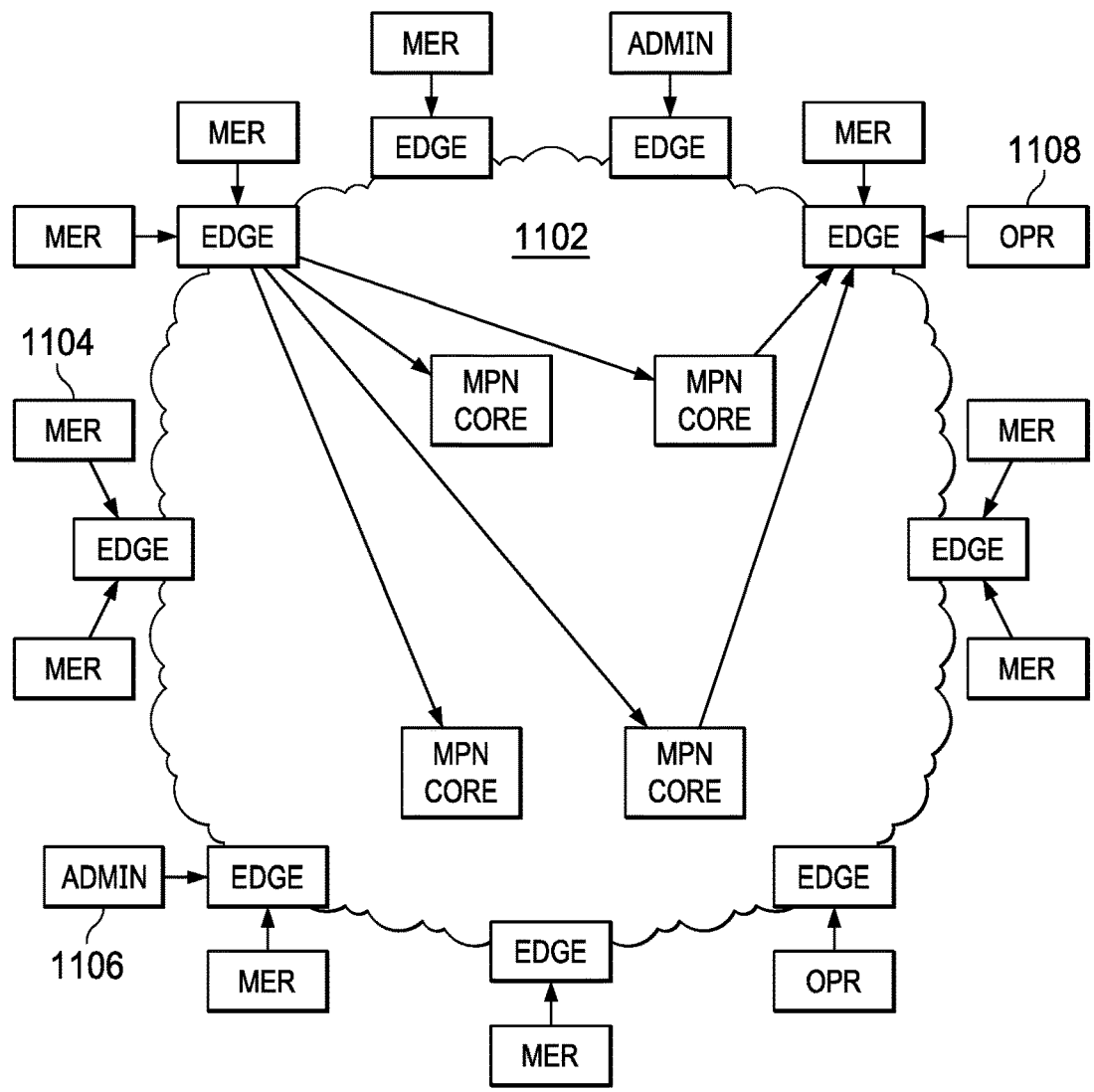
FIG. 11 depicts a block diagram of a payment network core surrounded by an overlay network edge network.

With reference to the above-described terms, FIG. 11 is another depiction of a representative system in which the overlay network edge servers 1100 act an entry point(s) for requests entering the payment network core 1102, either from merchant connectors (MERs) 1104 or from administrative servers 1106; optionally, the edge acts as the entry point for requests sent to acquirer/operator-based connectors (OPR) 1108 from the payment network core 1102. As previously described, among other performance benefits, the overlay network provides for routing optimization, attack resilience, rate limiting and client authentication prior to requests being forwarded toward the payment network core nodes. By isolating the core nodes in this manner, the overlay network provides resilience for a variety of attacks as well as mitigation for various types of localized Internet problems. As depicted, the overlay network edge effectively surrounds the payment network core, allowing other components (such as the merchant connector MER) to connect through it to reach the payment network core services. The vast scale of the edge network allows the payment network to scale linearly with workload, using the edge to balance traffic between the appropriate payment network core nodes.

The edge provides protection from Internet-scale attacks, blocking non-authenticated requests from reaching payment network core and blocking connections that fail to meet mutual authentication requirements. The edge also protects against non-HTTP-based DDoS traffic, such as SYN and UDP floods. Additionally, the edge provides enhanced performance and reliability. Preferably, TLS and TCP connections are terminated close to the merchant connector MER to provide performance gains. Connection pooling from the edge to the payment network core reduces the overhead of TLS negotiation. Preferably, each edge node can communicate with any payment network core node, routing location-specific requests to the proper location. This optimized routing preferably avoids payment network core locations that are heavily-located or undergoing maintenance. Preferably, the administrative server and the merchant connector MER connect to the edge using the same protocols and methods, as does an acquirer OPR. Payment network core services connect to the edge as client and may be routed to an acquirer OPR server.

Preferably, all HTTPS requests to the payment network core are first sent to the edge, where TLS is terminated and the client's identity verified. The merchant connectors and administrative server clients preferably connect to the payment network core using configured domain names.

The following sections describe in detail representative connection flows among clients, the edge, and the payment network core.

Figure 12:
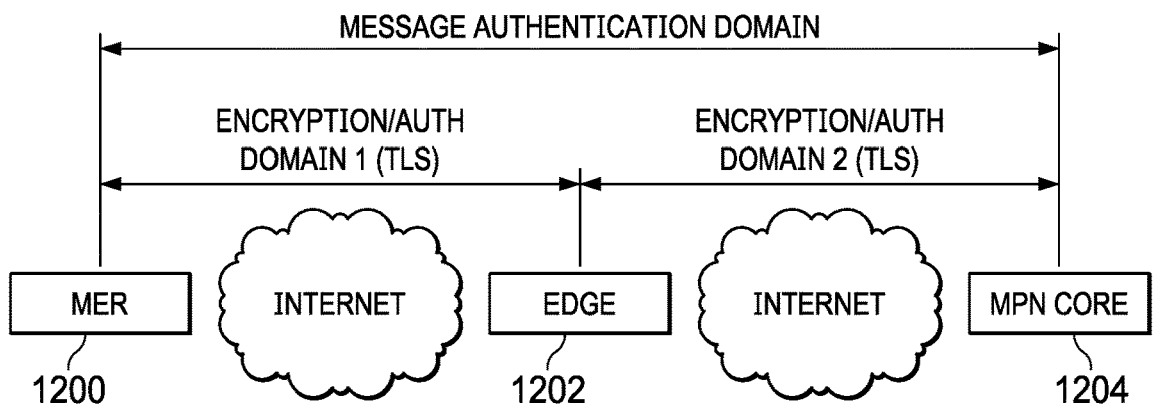
FIG. 12 depicts end-to-end connectivity among a merchant connector, an edge server network, and core elements of a blockchain-based distributed system of record.

Preferably, a merchant connector MER and its downstream components (e.g., POS terminals and cards) are physically and electronically secure. As depicted in FIG. 12, a merchant connector MER 1200 is coupled to the overlay network edge 1202 by resolution of a DNS lookup (to a managed hostname), thereby resulting in one or more edge IP addresses corresponding to edge servers. These servers preferably are close to the merchant connector 1200 from an Internet topology standpoint and use standard mutually-authenticated TLS-encrypted HTTP calls using port 443 over the Internet. From edge 1202 to the payment network core 1204, preferably the overlay network controls the connection flows and is responsible for their privacy and authenticity. Preferably, the edge 1202 is very diversely deployed across multiple ISPs and geographics, while typically the payment network core 1204 is deployed on a smaller geographic scale (e.g., in highly-secure locations that communicate with the edge 1202 via the Internet). Traffic between the edge and the core preferably is encrypted, authenticated, and authorized. In particular, preferably all messaging is encrypted in transit using TLS-based mutually-authenticated connections. As depicted, the message authentication domain preferably is end-to-end so as to protect against any compromised man-in-the-middle (MITM) element from forging messages. This ensures that any message the payment network core receives can be verified as having been signed by keys that have never been seen by any payment network core systems or personnel. The corresponding assertion preferably is also made for all messages merchant connectors receive from the payment network core.

Preferably, the overlay network edge is used to couple the payment network core (acting as a client) to the acquirer/operator OPR 1108 (FIG. 11), or to couple a administrative server 1106 to the payment network core.

Figure 13:
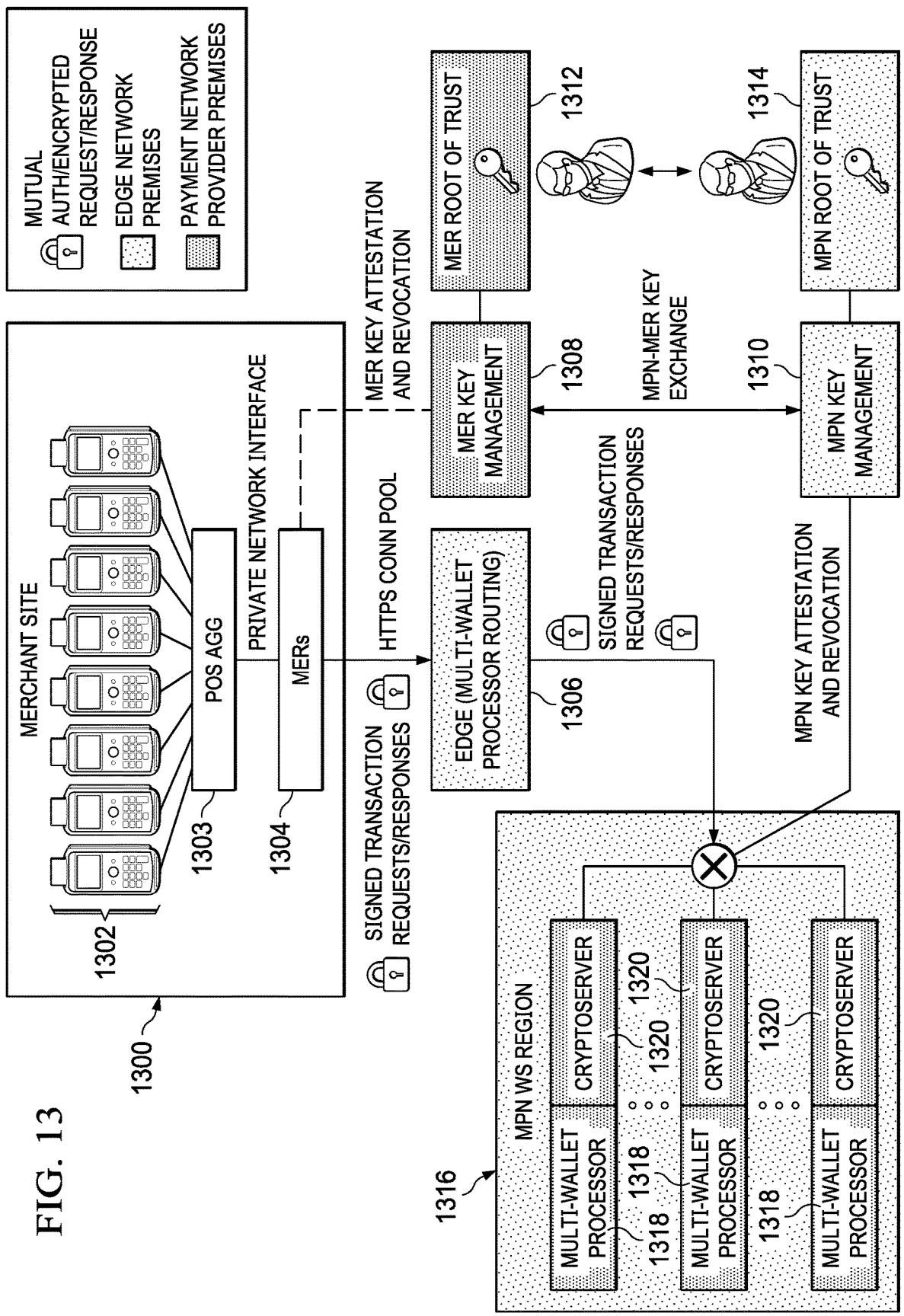
FIG. 13 depicts a merchant Point-of-Sale (POS) system interfacing with a merchant connector to interoperate with the payment network via the intermediary of an overlay network edge, together with components of a key management infrastructure according to this disclosure.

FIG. 13 depicts a portion of a representative system implementation and, in particular, a key management scheme. As depicted, there is a merchant site 1300 comprising legacy architecture, such as POS terminals 1302, a point-of-sale terminal aggregator 1303, and one or more merchant connectors (MERs) 1304. The system also comprises the edge network 1306, a merchant connector (MER) key management component 1308, and a payment network (PN) key management component 1310, the latter typically located in association with a premises of a service provider that operates the payment network. As depicted, preferably there is also a merchant connector (MER) root-of-trust 1312, and a payment network root-of-trust 1314. The edge network also comprises a payment network wallet services region 1316 comprising a set of multi-wallet processes 1318, each associated with a crypto-server (CS) 1320. As used herein, a "region" typically is a co-located set of servers.

The following describes the management of cryptographic keying material required to support payment network-merchant secure interoperation in the example embodiment depicted in FIG. 13. This architecture is not intended to be limiting, however.

From a perspective of the overlay network service provider, preferably communications with merchant connectors are such that (1) no system or provider personnel have access to the keying material that might otherwise be required to forge merchant connector transaction requests, and (2) no systems sitting between the merchant connectors and the payment network elements are able to forge payment network transaction responses.

Security is achieved in this distributed system preferably using asymmetric cryptography. More generally, security is facilitated using the following design principles with respect to the system shown in FIG. 13:

1. Trustless elements—Building secure (trusted) services on top of components where no one or small set of components are themselves trusted. As an example, the nodes of a blockchain network do not trust one another, and in general, wallets do not trust the ledger in so far as they require cryptographic proof that the ledger is valid and that transactions are on the ledger. Transactions on the payment network ledger are signed individually for each transaction input and are therefore self-verifiable; thus, the ledger can be trusted without trusting the nodes of ledger services. This drives a requirement that merchant (MER)-originated transactions be trustworthy and, further, that a chain of trust be maintained between the two (or more) messaging regimes.

2. Root of trust and chain of trust—Where trust must be established it is established in layers starting with a root of trust (generally a key-pair) where the strongest security measures are applied. Such strong measures imply access that is infrequent, inconvenient, time consuming, and expensive. Trust in any data in the system preferably descends from the root of trust in a chain of trust where each link in the chain can be verified against previous links back to the root. Each link in the chain, however, inherently represents a relaxation of trust in favor of more frequent automated access with associated security controls and limits.

3. Segregation—the key management and roots of trust for different services preferably are segregated. Thus, a compromise in one service does not threaten the integrity of other services. For the services to interoperate requires an exchange of respective roots of trust (e.g., trusted persons or entities meeting and attesting to the authenticity of public key material associated with the private key material comprising their respective roots of trust). From this exchange, subsequent interactive or electronic exchanges of derivative key material can be performed such that the authenticity of the derivative key material can ultimately be verified against the root of trust.

4. Defense in Depth—Segregation also is applied in the layers of a service. For example, the keying material necessary to establish mutually-authenticated connections preferably is different than the keying material necessary to establish individually authenticated messages. For example, even though transactions to be recorded on the blockchain travel over secure links (i.e., connection level authentication), preferably each transaction is still individually signed (i.e., message level authentication). This way a compromise at the connection level authentication does not imply total loss of secrecy (assuming the use of ephemeral session keys) and does not impart the ability to forge or alter transactions.

5. Division of Role and Role based Limits—It is important to identify roles of the elements on both sides of the various trust boundaries in a system, and to define policy and limits to match the purpose and powers of each role, thus containing the risk associated with compromises.

6. Rotation—because each link in a chain of trust comes with a relaxation in protecting access to the private material, preferably keys are routinely and emergently changed (i.e. rotated). In one embodiment, the active service key space is segregated both in time and domain. For example, each device gets its own key that preferably is rotated on a daily basis.

7. Attestation and revocation—Attestation is the act of attesting to the authenticity of data (e.g., a key) via a chain of trust. Revocation is the reverse, but it also involves the chain of trust to mitigate false revocations that would threaten service availability.

FIG. 13 depicts the merchant Point-of-Sale (POS) system interfacing with the merchant connector to interoperate with the payment network via the intermediary of the edge, in the manner described. As noted, this is just an example embodiment, and there will be a variety of merchant connector deployment scenarios that the key management techniques herein support.

In one embodiment, merchant connector key management component 1308 is a sub-function of a administrative server, and the payment network key management 1310 is a sub-function of a data cooperation service. This is not a requirement, however.

Payment Network-Merchant MER Secure Communications

The key management system end-to-end supports the secure communications requirements of payment network to merchant connector interoperation. In the following design, preferably keying material is used at different levels to establish defense-in-depth security.

To handle transaction requests and responses, the merchant connector preferably uses key material in the following ways:

1. A TLS client authentication private key to prove the authenticity of the merchant connector server in establishing a TLS connection with the overlay network edge.
2. A TLS server authentication Certificate Authority (CA) certificate to verify the authenticity of the overlay network edge server to which the merchant connector is connecting.
3. An API key in an HTTP header of each request and response. The overlay network API gateway service running on the overlay network edge checks the API key header in each request to verify the end-point (namely, merchant connector) is still authorized to use the service. This key preferably is managed via an overlay network portal and is the most easily and quickly revocable should merchant connector compromise be suspected.
4. A client JWT (JSON Web Token) secret key to prove the authenticity of the merchant connector server sending the transaction.
5. A server JWT public key to verify the authenticity of the payment network server sending the response.

The payment network key usage preferably mirrors the above, namely:

6. A TLS client authentication CA certificate to verify the authenticity of the merchant connector server initiating the TLS session.
7. A TLS server Authentication private key to prove the authenticity of the overlay network edge server in accepting a TLS connection from the merchant connector.
8. The API key in the HTTP header of each request and response.
9. A client JWT secret key to verify the authenticity of the merchant connector server sending the transaction.
10. A server JWT private key to prove the authenticity of the payment network server sending the response.

While each of these layers of protection (connection authentication, API usage authorization, and transaction authentication) serve an important purpose, the client and server JWT key-pairs provide significant advantages. The JWT key-pairs protect the integrity of transactions, maintaining a chain of trust between and the merchant connector request and its payment network response, and they do so in a way that enables load balancing and failover to support high throughput, low latency transaction handling.

Identity

To be meaningful, the keys used in the system preferably are tied to some identity that the key management system uses for the purposes of attestation and revocation and that endpoints use in their messaging.

The following comprise representative identity elements of this design: domain names, TLS Server Name Indication (SNI), HTTP host names, forwarding center identifier (IDs), and payment center identifiers (IDs).

Preferably, each merchant connector server is configured to use a set of one or more domain names in looking up overlay network edge server addresses to which to connect. The mapping of the domain name to the overlay network edge servers may change due to any number of factors: load, increased network delays, planned maintenance, machine or region outage, etc.

Preferably, a merchant connector honors the Time-To-Live (TTL) set on a payment network domain name. The set may only contain one domain name, but depending on the load the merchant connector is expected to produce, the set may contain multiple domain names from which the merchant connector select forms on some prescribed basis (round robin or random, for example). Further, preferably each domain name has a prescribed backup domain name. The backup connection is used in the event the primary server connection breaks or is unresponsive.

Preferably, each merchant connector uses a TLS Server Name Indication (SNI) in establishing a connection to the overlay network edge. The TLS SNI preferably matches the hostname provided in the HTTP Host header. Preferably, the SNI and HTTP host name are commonly, but not always, based on the domain name. TLS and API credentials typically are bound to hostnames. Consequently, for security and safety reasons, preferably each merchant connector server (or collocated set of merchant connector servers serving the same set of POS terminals) use a unique hostname.

A forwarding center identifier is used in an ISO8583 message to indicate which message authentication key is used by the merchant connector server to sign the transaction request. For security and safety reasons, preferably each merchant connector server (or collocated set of merchant connector servers serving the same set of POS terminals) use a unique forwarding center ID.

A payment center identifier ID is used in an ISO8583 message to indicate which message authentication key was used by the payment network server to sign the transaction response. For security and safety reasons, preferably each payment network server uses a unique payment center ID.

Key Management Segregation

The merchant connector server network and payment network server network typically represent different service domains. As described above, when two services interoperate it is important to segregate the security of the two systems such that a compromise of one does not lead to a compromise of the other. It is also important that disparate security systems have the capability to evolve separately from one another. In the FIG. 13 block diagram, this segregation is highlighted by indicating the separation of merchant connector key management from payment network key management. The key management technology need not be different, but it is desirable that the physical systems, locations, and personnel be segregated.

Roots-of-Trust

Each key management system preferably has its own root-of-trust. This is generally embodied as a strong asymmetric key-pair where the secret key is kept offline and protected with robust security measures. The public key for each root of trust is then shared with the other key management system. Authenticity of the public key preferably is verified, and this is generally done by trusted representatives of each authority exchanging the public keys. Once root-of-trust public keys are exchanged, each party can now verify the authenticity of an online message signed by the associated root-of-trust secret key. Preferably, the root-of-trust secret keys are kept in a safe and protected with (k-of-n) onion encryption, the keys of which are held by different trusted persons (namely, via a secret sharing protocol). Consequently, the root-of-trust keys may only be used infrequently, such that their use is generally limited to exchanging other keys, such as the attestation key-pairs described next.

Attestation Key-Pairs

An attestation key-pair preferably is used for the secure electronic exchange of TLS authentication keys (TLS Keys), Application (App) Gateway API keys (API Keys), and Client/Server JWT keys (JWT Keys) used for actual payment network and merchant connector communications. The attestation public key for each key management system is signed by its respective root-of-trust private key and sent electronically to the other key management system, wherein its authenticity is verified against the originating system's root-of-trust public key. An attestation public key may also be revoked, once again using the root-of-trust. Once the authenticity of the attestation public keys is verified, the respective key management systems can use the corresponding attestation secret keys for the attestation or revocation of the TLS Keys, API Keys, and JWT Keys.

TLS Keys

Preferred best practices in TLS key handling are summarized here.

The server (payment network) and client (merchant connector) certificates used for TLS session mutual authentication are usually generated by external systems, signed by a Certificate Authority (CA), and securely imported into the key management system where they are securely communicated to clients and servers for use in TLS session establishment.

For the payment network, preferably server certificate(s) are generated using the overlay network's TLS certificate management system, e.g., a system that securely communicates the certificates to the overlay network edge servers. The overlay network's TLS certificate management system may also be used to revoke TLS keys emergently, and this system preferably supports the Online Certificate Status Protocol (OCSP) to aid clients in checking certificate revocation status.

Preferably, the payment network has a key management system that performs attestation and revocation of the payment network TLS CA(s) to the merchant connector key management system.

Preferably, a merchant connector uses valid (unexpired and unrevoked) client certificates that match the domain name expressed in the TLS SNI by the merchant connector in establishing connections to the payment network via the overlay network edge.

Preferably, a merchant connector checks server certificate status, and it establishes connections only where valid (unexpired and unrevoked) server certificates are presented that match the domain name expressed in the TLS SNI by the merchant connector in establishing connections to the payment network via the overlay network edge.

For the merchant connector, a similar TLS certificate handling system is assumed to exist. Thus, the merchant connector key management system preferably performs attestation of the merchant connector TLS CA(s) to the payment network key management system.

Preferably, an overlay network edge server uses valid (unexpired and unrevoked) server certificates that match the domain name expressed in the TLS SNI by the merchant connector in establishing connections to the payment network via the overlay network edge.

Preferably, an overlay network edge checks client certificate status and accepts only connections where valid (unexpired and unrevoked) certificates are being used.

Note that revoking a TLS certificate does not break the TLS connections the certificates were previously used to establish. Thus, preferably TLS connection lifespan is limited, thus forcing new connections and eventual detection of revoked certificates.

To ensure both system security and system safety, preferably certificate revocation is enabled per merchant connector server (or per set of co-located servers serving the same underlying set of merchant terminals). To this end, a merchant connector is configured to use a different domain name (or set of domain names) and matching Client TLS certificate.

API Keys

The overlay network API Gateway keys preferably are symmetric keys administered by an API gateway service. The overlay network portal may be used to administer API Keys.

A merchant connector server preferably includes an API key header in each message it transmits to the overlay network edge API gateway.

Preferably, the overlay network edge system checks that each received message contains a currently valid API Key.

As with TLS keys, the API Keys preferably can be revoked, e.g., in the overlay network portal where the revocation is automatically communicated to the overlay network edge.

Preferably, the assignment of API Keys mirrors that of the other keys, namely, that each merchant connector (or co-located set of merchant connectors) be assigned its own API Key such that a compromised merchant connector can be quickly blocked from communicating to the overlay network edge without affecting other merchant connectors.

JWT Keys

The JWT Keys preferably are asymmetric message authentication keys, and they are used to sign and verify the authenticity of each message. Client JWT secret keys are used by merchant connectors to sign transaction requests, the client public keys are used by the payment network to verify the authenticity of incoming transaction requests. Likewise, server JWT secret keys are used by the payment network to sign transaction responses; server JWT public keys are used by the merchant CNs to verify the authenticity of transaction responses.

Client Key Requirements

Preferably, the merchant connector key management system performs attestation and revocation of client JWT public keys to the payment network key management system. Preferably, there are at most two such keys concurrently attested for each merchant connector server (more specifically, per forwarding center ID). This is to support client JWT secret key rotation without service interruption. Once a key rotation is complete, the decommissioned client JWT public key is revoked.

Preferably, a merchant connector server signs every transaction request message using a secret key corresponding to a currently attested public key for the forwarding center ID indicated in an ISO8583 transaction message.

Preferably, the payment network verifies the client signature of every merchant connector originated message using the public key(s) currently attested for the forwarding center ID indicated in the ISO8583 transaction message.

Server Key Requirements

The payment network key management system preferably performs attestation and revocation of server JWT public keys to the merchant connector key management system. Preferably, there are at most two such keys concurrently attested for each payment network server (more specifically, per payment center ID). This is to enable server JWT secret key rotation without service interruption. Once a key rotation is complete, the decommissioned server JWT public key is revoked.

Preferably, a payment network server signs every transaction response message using a secret key corresponding to a currently attested public key for the payment center ID indicated in in an ISO8583 transaction response message.

Preferably, a merchant connector verifies the server signature of every payment network transaction response message using the public key(s) currently attested for the payment center ID indicated in the ISO8583 transaction response message.

ISO8583 Message Support

To identify the server JWT public key needed to verify a transaction response, the payment center ID is communicated in the ISO8583 transaction response. In one embodiment, this information in included (in the ISO8583 message) by adding it to the Common Header. To this end, preferably a Payment Center ID field is populated by the payment network such that response data recorded by the payment network and by the terminal, respectively, for the purposes of clearing are identical.

Cardinality Expectations

The cardinalities of the payment network and merchant connector networks are important to bounding the size of key-stores supported by each. As described, preferably the merchant connector servers possess server JWT public keys (one for each payment center ID), and the payment network servers possess client JWT public keys (one for each forwarding center ID).

Payment Network Key Management

This section provides one embodiment of how keys preferably are managed inside the payment network.

As noted above, preferably crypto server trusted computing environments are used to mitigate exfiltration and exploitation of secret key material, and more generally to support constructing a chain of trust that spans the ISO8583 transaction request, to a payment network transaction and its corresponding blockchain receipt, and to the ISO8583 transaction response. As noted above (and as depicted in FIG. 13), the crypto server typically is implemented as a networked-security appliance attached, e.g. to each payment network server (a Wallet Services multiple Wallet Processor) that interoperates seamlessly with the payment network key management system.

Key Generation

Unlike traditional centralized key management systems, preferably the management of the server JWT keys is decentralized such that key-pairs are generated by crypto server-trusted computing environments, and the secret keys are never exposed outside these environments. Thus, even when the keys are transferred or stored outside a crypto server, they are encrypted using the public keys of crypto servers such that the secrets can only be revealed inside those trusted environments. Preferably, the server JWT public key is exported from the crypto server and sent to the payment network key management system where it is attested to the merchant connector key management system for use by merchant connectors in verifying transaction responses.

Preferably, some number of crypto servers are used in the payment network key management system to better preserve the chain of trust spanning the entire system.

Message Authentication Chain-of-Trust

The crypto server trusted computing environments preferably are also used to verify the authenticity of ISO8583 transactions received in JWT messages from the merchant connectors. Consequently, the client JWT public key attestations received from the merchant connector key management system preferably are verified and recorded inside the crypto server. Upon completion of the payment network transaction, the JWT response containing the ISO8583 transaction response is signed by the crypto server using the server JWT secret key. In so doing, an unbroken chain of trust is established from before transactions enter the payment network to after they leave the payment network.

Acquirer (Operator) Integration Via Hosted Origin Services

Typically, an acquirer/operator has a private network-based computing environment over which outgoing connections to the payment network are made from an operator-based connector (OPR), although the particular implementation details of that environment are necessarily private. From the overlay network provider perspective, however, these details are not required to be known provided that (1) systems sitting between wallet services (WS) and such OPRs are unable to forge requests and (2) no system or overlay network service personnel have access to the keying material required to forge acquirer OPR responses. Thus, from an end-to-end perspective, wallet service-to-operator OPR communications should be unassailable. To that end, this aspect of the disclosure provides a service that adapts legacy acquirer environments to the payment network native environment. This service preferably is constructed from a set of servers collectively called an "operator (acquirer) connector origin" comprising one or more OPR origin servers, which are preferably located in an OPR Origin Center. In this context, the term "origin" connotes a conventional architectural role that such servers have with respect to overlay network-based systems. In particular, the origin is one or more servers that the overlay network (typically an edge) contacts when a request cannot be fulfilled locally (at the edge server or edge region that includes the edge server), and where results returned by an origin are then stored locally for future use. This notion maps intuitively to a payment network concept of not being able to satisfy a transaction using a local managed value transaction, falling back instead to execute a financial message transaction with the acquirer, and recording the result on the ledger. To this end, the payment network is configured (as described herein) to initiate connections to OPR origin servers as necessary. Standard origin performance, resilience, and security practices are then applied via the overlay networking technologies.

Preferably, operator-based connectors (OPRs) are constructed from secure computing environments and deployed as managed appliances. This approach enables enclave-to-enclave (payment network-to-operator connector) message level security.

In one embodiment, the OPR is located on the acquirer premises and handles incoming connections in much the way a CDN origin server would. In particular, the OPR accepts incoming connections from the payment network. In such case, the OPR receives keying material from the payment network operator and uses that material to verify the authenticity of requests received from the payment network, and to sign responses such that the payment network can verify the authenticity of the responses. In this example, the overlay network (acting as an intermediary) is not in possession of the keying material necessary to produce verifiable OPR responses. An advantage of this arrangement is that the legacy interconnect and the servers are confined to the acquirer premises, which likely has a very high physical and network security profile. Also, the legacy software (in the acquirer infrastructure) requires minimal changes. A disadvantage, however, is that this approach requires the acquirer to host an OPR that handles incoming connections. This, in turn, requires a firewall or some form of strong protection against attacks on the network links and interfaces that provide access.

A second embodiment involves a variation on the previous embodiment, although the protocols and data flows are similar. In this approach, the operator establishes secure/private links to one or more OPRs hosted outside their premises/facilities, although not hosted as part of the overlay network itself. Although this approach reduces risks associated with hosting the OPR within the acquirer's premises, a better approach is provided by a third embodiment, which is now described.

Figure 14:
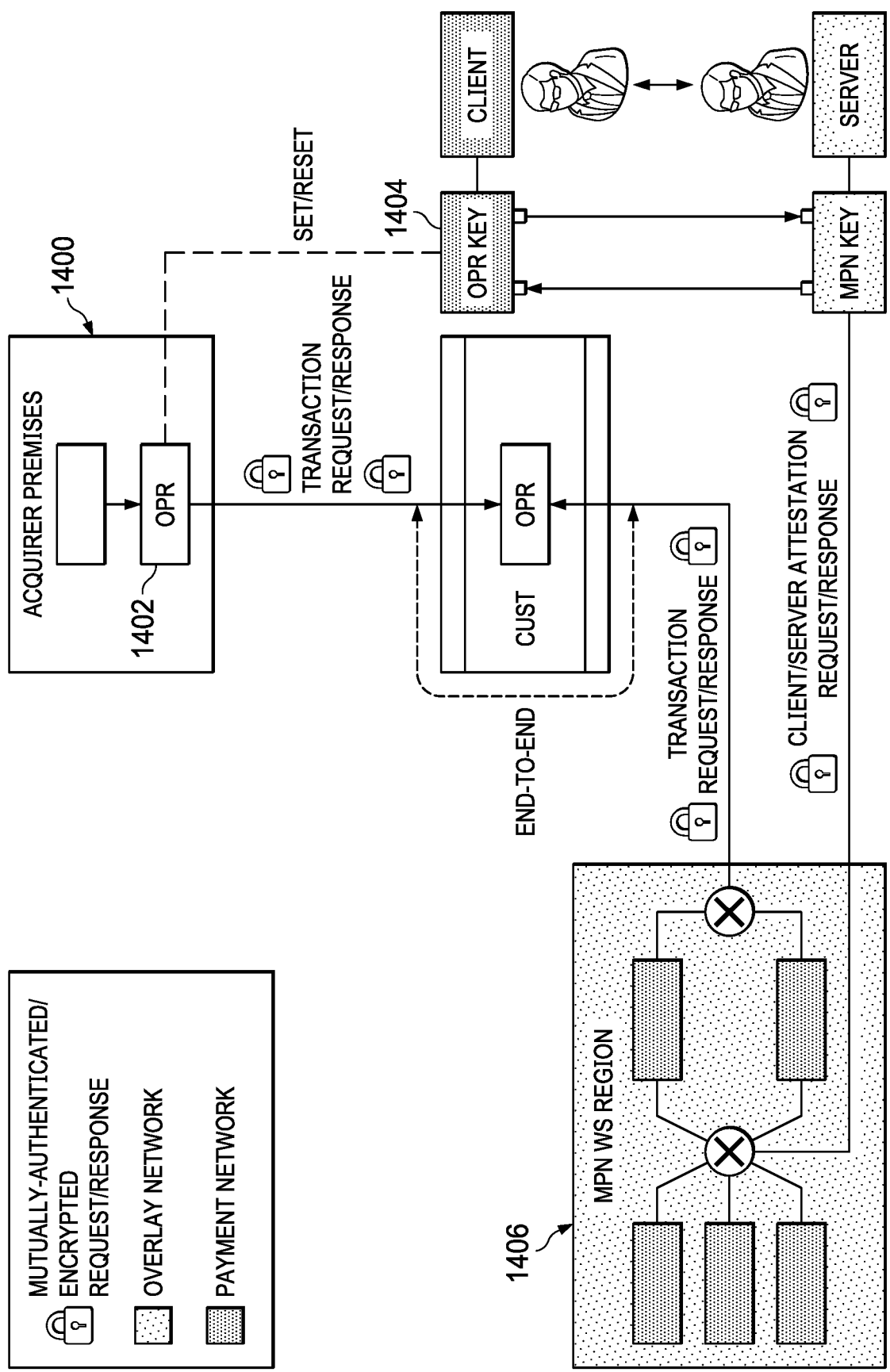
FIG. 14 depicts how overlay network infrastructure is used to host an acquirer/operator origin service to facilitate integration of an acquirer/operator transaction processing system into a payment network.

In this embodiment, which is a preferred approach, and as depicted in FIG. 14, the OPR responsibility is divided and segregated. In particular, an OPR 1402 preferably located on the acquirer premises 1400, but preferably only to make outgoing connections to the payment network. To that end, this portion of the OPR preferably comprises one or more secure computing environments and that receives keying material 1404 from a provider of the payment network (not the overlay network provider). Within the acquirer infrastructure, any legacy computing environments connect to the OPR in a conventionally manner. Internally, however, preferably the on-premises OPR verifies all signatures for requests received from the payment network, and it signs all responses it sends to the payment network.

The overlay network, or some other entity (other than the payment network provider), hosts a set of OPR origin servers, thereby allowing the lines of connectivity to be reversed. In this example, which is not intended to be limiting, the overlay network includes a payment network wallet services region (i.e., a set of co-located servers) 1406, which act as the hosted OPR origin. In particular, the overlay network-hosted OPR origin servers have TLS mutual authentication certificates, but they do not have the keying material necessary to produce verifiable OPR requests. Rather, preferably only secure modules in the wallet services have that keying material. Likewise, and to simplify the OPR communications requirements further, preferably the payment network routes its requests through the overlay network-hosed OPR origin, but again preferably that origin does not have the keying material necessary to produce verifiable OPR administrative requests; rather, preferably only the payment network provider would have this material.

Because the overlay network-based OPR origin servers are handling incoming connections, these servers preferably are hosted in multiple locations where at least one location is protected by an overlay network scrubbing center. The link capacity and filtering logic of a scrubbing center provides effective protection against denial-of-service, or distributed denial of service (DoS/dDoS) attacks, thereby serving as a firewall allowing only connections from configured endpoints on either side.

Preferably, and to provide protection against OPR compromise, OPRs are constructed from crypo-service technologies such as described above, such that the OPR transaction request/response protocol, as well as the key management protocol, are processed in secure execution environments. With this approach, the OPR effectively becomes an appliance that is administered remotely. Preferably, key management is bootstrapped with a root of trust during the OPR manufacturing process, such that keying material can be securely managed later when the OPR is on the acquirer premises. The root of trust enables the OPR to generate an encryption key-pair and authenticate the public key to a corresponding key management system.

The technique described above provides significant advantages. It provides for a distributed system of record architecture that includes hosted origin services and associated security technology that provides legacy payment network operators with highly-secure and resilient access to a blockchain-based payment system. The approach provides inbound connectivity both to the external payment operator as well as from a blockchain payment network such that the legacy system connects to the new payment system as it would in a traditional payment system, but the new payment network can interface to the legacy operator system as it would an web origin server.

Operator OPR Connections

The following provides additional details regarding the system shown in FIG. 13.

For connections where the payment network is the initiator, the multi-wallet processors within the payment network establish connections as clients. Typically, these processors establish such connections according to the distribution of acquirer wallets, and other requirements. Typically, the connections are concentrated or multiplexed into a smaller number of upstream servers within the overlay network, and it is from this smaller, more limited set of servers, that connections preferably are then made to the acquirers.

Connections are made outbound from the overlay network to an acquirer preferably using TLS-based mutually-authenticated connections, and these connections preferably are persisted to the acquirer by the upstream servers within the overlay network. To protect the upstream servers, the overlay network may implement origin hiding techniques and access restriction, in addition to mutual authentication. Origin firewall rules are then applied at the acquirer to restrict access except from the designated upstream servers. Connections within the overlay network preferably are made from each multi-wallet processor to the upstream servers using TLS mutual authentication, and preferably the internal topology is not reachable from the external network. Preferably, individual requests are received, framed and sent to the acquirer, and the responses returned to the respective multi-wallet processor. In this process, preferably standard client connection semantics are employed as well as HTTP request/response semantics originating multi-wallet processor making the original request.

For connections wherein the acquirer is the initiator, the acquirer server acts initially as a client to establish TLS mutually-authenticated connections to a set of servers with the overlay network edge. Preferably, source IP addresses are checked against a suitable ACL (access control list), in addition to mutual authentication. Preferably, further "upstream" connections are made by the overlay network edge to the individual multi-wallet processors within the overlay network. Similar to the above, connections within the overlay network preferably are made from the edge to the multi-wallet processors using TLS mutual authentication, and the internal topology is not reachable (i.e., hidden) from the external network. Upon establishment of forward connections, typically the roles are reversed. The multi-wallet processors assume the role of client, and the acquirer assumes the role of server. These interactions may be facilitated using HTTP/2 (e.g., server push, connect), WebSockets, or the like. Preferably, individual requests are received at the overlay network edge, re-framed and sent to the acquirer, and the responses returns to the respective multi-wallet processors. Further, the acquirer may implement DNS-based load balancing and failover of connections and connection traffic across the overlay network edge.

Wallet Services

The following describes an Application Programming Interface (API) to facilitate establishing and maintaining merchant MER secure connections, as well as operator OPR secure connections.

For secure merchant MER connection with Wallet Services, an Application Programming Interface (API) gateway, which allows for greater control and scale of incoming transaction requests, may be used.

Preferably, requests to the overlay network edge is an RFC 7519-compliant JWT ES256 request. For header authentication, preferably each request to the overlay network includes an API key header. Preferably, each JWT request includes a sequence number agreed to via a sequence handshake protocol. Preferably, every connection to the edge is via a mutually-authenticated TLS connection. Further, preferably connections to the edge are persistent and execute a DNS lookup and reconnect (refresh) protocol as follows: on connection loss, and at the DNS TTL for the provided DNS hostname, the TTL value is returned in the DNS record.

Preferably, there are four (4) keys that a MER connector uses to send and validate a valid request: an Edge Server Auth Certificate Authority (CA), a TLS Client Authentication Key, a JWT ES256 Signing Key, and an API Header Shared Secret. The Edge Server Auth CA preferably is an ECDSA P-256 (prime256v1) SHA-256 hash that is supplied by the overlay network edge provider, preferably with a public portion supplied via a data cooperation services to the merchant MER connection; it is used for validation in each request. The TLS Client Authentication Key preferably is an ECDSA P-256 (prime256v1) SHA-256 hash that is provided by the network operation, signed by a master merchant MER client auth CA, and preferably the key is unique per endpoint. The JWT ES256 Signing Key preferably is an ECDSA P-256 (prime256v1) key provided by the network operator, with a public portion supplied via a data cooperation service; preferably this key is unique per endpoint. The API Header Shared Secret, e.g., may be 64 random characters, and it is supplied by the overlay network edge provider via the data cooperation service; preferably, this key also is unique per endpoint.

Every request preferably is an HTTP-formatted request containing a RFC 7519 JWT ES256 request, and the request includes an API key header. Every response preferably is RFC 7519 JWT ES256 formatted. The response is signed using the same key as the request; this signature must be verified.

The following list contains representative API endpoints. One endpoint is an /api/ . . . /iso8583 type, which is an API endpoint used to submit an ISO-8583 transaction. Its sequence number increments with each request. Another endpoint is an /api/ . . . /sequence type, which is an endpoint used in a sequence number establishment protocol described below. The request nonce for this endpoint type is a unique and random unit64 value.

The following list contains expected responses to the API requests. Preferably, the response is JWT ES256 encoded using the same key, and this must be verified. For the /api/ . . . /iso8583 type, the response sequence number should be verified to match the request sequence number. An error string should be blank for non-error cases. For the /api/ . . . /sequence, the response nonce should be verified to match the request nonce. The sequence number provided is the initial value that is used for future requests.

The /api/ . . . /sequence endpoint is used to establish an initial sequence number. If an /api/ . . . /iso8583 response alerts to an error condition related to an "invalid sequence number," then this endpoint is used to establish a new sequence number. This mechanism is used to prevent transaction replay attacks against the payment network.

Every connection to the overlay network edge preferably is over a mutually-authenticated TLS connection. Preferably, TLS connections must: verify the certificate provided by the overlay network edge is issued to a trusted CA (the trusted CA list may change periodically or emergently); and provide a client certificate issued by a trusted CA that the overlay network edge must verify (typically, a network operator controls this CA and provides the overlay network provider a trusted CA list to perform client authentication). Establishing rigorous CA and certificate management practices and procedures, including issuance and revocation, is important to ensure secure interoperability with external systems, especially legacy systems. Preferably, multiple-trusted CAs are exchanged by both the overlay network and the network operator to allow for easier transition in the event of compromise. An appropriate plan for CA rotation should also be used.

As noted above, preferably connections to the edge network server are persistent but execute a new DNS lookup and reconnect on connection loss, and at upon expiration of a DNS Time To Live (TTL) for a provided hostname. When DNS lookup returns a same result, the old connection can continue to be used. Preferably, up-to-date TTL is returned as part of the response to each DNS lookup.

Figure 15:
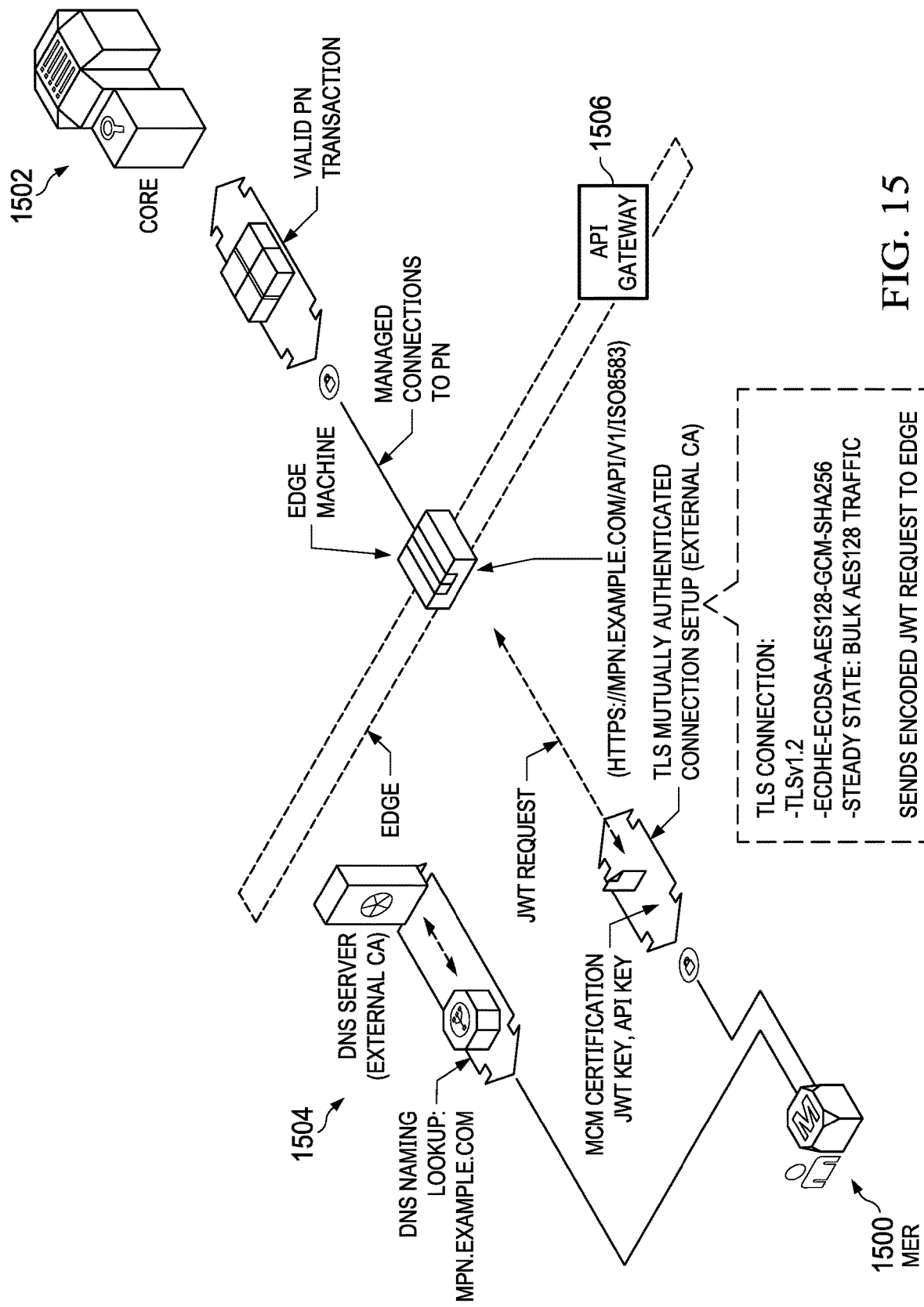
FIG. 15 depicts how an edge network facilitates secure interoperability between a legacy external system and a blockchain-based payment network core according to a further aspect.

FIG. 15 depicts an example of a secure interoperation of a legacy system (via a MER) 1500 to the blockchain-based payment network core 1502 via an edge network intermediary 1504 according to this disclosure. An example encoded JWT request is also shown.

Thus, preferably all connections are mutually-authenticated and encrypted, and the associated TLS keys and certificates managed as described above. Connection-based mutual authentication and encryption provides one layer of security that is enforced by the overlay network edge. As additional protection, message authentication also may be used to provide a distinct and deeper layer of security that secures end-to-end authenticity of messages passing through the edge and other potential intermediate overlay network elements. A representative message authentication framework that provides this protection layer is now described.

Preferably, all signatures on HTTP messages (requests and responses) are generated, transmitted and verified according to a message authentication specification. That specification dictates that authenticated messages must contain an HTTP Authorization header with a given syntax, e.g., {auth-line, auth-scheme, auth-spec, key-id, ecdsa-public key, signed-headers, lowercase-header-name, request-sig-string and sig}. To comply with the specification, all HTTP request messages are signed, preferably according to a suitable request signature derivation function. In particular, for HTTP requests, a hash-to-sign input to the Authorization header signature is derived by rules set forth in that function. The specification further requires that all HTTP response messages are signed for responses with 2XX or 3XX status codes. For HTTP responses, a hash-to-sign input to the Authorization header signature is derived as specified by a response signature derivation function.

The Message Authentication (HTTP) keys are asymmetric message authentication keys, and these are used to sign and verify the authenticity of each message (end-to-end). Client HTTP secret keys are used by merchant MERs (and the administrative server components) to sign messages destined for the payment network, and the client public keys are used by the payment network to verify the authenticity of incoming messages. Likewise, server HTTP secret keys are used by the payment network to sign responses, and server HTTP public keys are used by merchant MERs (and the administrator server) to verify the authenticity of the responses. For operator OPR communications, the roles are reversed, with the payment network signing requests and operator OPR servers signing their responses.

As used herein, a "deployed" key is a public key that has been attested to by an originating system and confirmed as deployed by the receiving system.

The following are representative client HTTP key requirements.

Preferably, an administrative server system performs attestation and revocation of client HTTP public keys to the payment network via a data cooperation service API.

Preferably, an administrative server signs every request message to the core payment network using a secret key corresponding to a currently-deployed administrator public key.

Preferably, the payment network verifies the client signature of every administrative server-originated message using the administrator public key currently deployed.

Preferably, each merchant MER server signs every transaction request message using a unique secret key corresponding to a currently-deployed public key for a forwarding center ID indicated in a payment network ISO8583 transaction message.

Preferably, the payment network verifies the client signature of every merchant MER-originated message a currently deployed public key for the forwarding center ID indicated in the payment network ISO8583 transaction message.

The following are representative server HTTP key requirements.

Preferably, the payment network system must attest and revoke payment network server HTTP public keys to the administrative server.

Preferably, the payment network signs every response message to the administrative server using a secret key corresponding to a currently-deployed payment network public key.

Preferably, the administrative server and the merchant MER servers verify the signature of every HTTP response message using the payment network public key currently deployed.

Preferably, the payment network must sign an HTTP request message to an operator MER server using a secret key corresponding to a currently-deployed payment network public key.

Preferably, the operator OPR servers must verify the signature of every HTTP request message using a currently-deployed payment network public key.

Merchant MER servers use a merchant MER endpoint to send transaction requests to the payment network. The body of the message preferably is a JSON object containing a "req" key with a string value containing a base64 encoded ISO8583 message. On success, the response will have 200 (OK) status code and the response body will contain a JSON object containing a "rsp" key with a string value containing the Base64 encoded ISO8583 response message.

The payment network uses an operator OPR endpoint to send transaction requests to the operator OPRs of a destination center operator OPR server. The body of the message preferably is a JSON object containing a "req" key with a string value containing a Base64 encoded ISO8583 message. On success, the response will have 200 (OK) status code and the response body will contain a JSON object containing a "rsp" key with a string value containing the Base64 encoded ISO8583 response message.

In a representative embodiment, the API described above is implemented in an API gateway located at the edge network. The API gateway provides a mechanism to enable the operator to register, manage and deliver its API. Among other things, the API gateway provides access control, traffic management, reporting, policy definition and other cloud integration. For access control, the gateway validates JSON web tokens (JWT) and API keys, thereby enabling offloading of Identity Provider (IdP) services. The gateway facilitates API key creation and management throughout their lifecycle. It operates to authenticate traffic before it reaches an origin server, and it is useful to reject undesirable API calls. For traffic management, the gateway enables a user to set and enforce limits on incoming API requests per unit of time, and per API consumer. Internal levels of API access to internal teams, strategic partners and developers can be set and managed. The reporting enables the user to learn how API consumers are using the API, and to address error patterns, thereby enabling a user to optimize API delivery. A representative API gateway is provided by Akamai Technologies, Inc. of Cambridge, Mass.

Use Cases

The above describes a high performance core distributed ledger and transaction fabric for use, for example (but without limitation), in a payment network. Transactions are not limited to the primitive of moving value of sources to destinations, but rather any processing involving the transformation, conversion or transfer of value or information. The performance core provides the foundation to support a myriad of use cases including, without limitation, high performance transaction processing to financial systems.

As used herein, processing time is defined as the time elapsed between when an operation request (e.g., a financial operation request) is received and when a response is available. A particular operation may require more than one transaction on the ledger. An operation is considered to be fully process when all required transactions have been securely stored in the ledger and all relevant business logic has been executed. Preferably, processing time is on the order a couple seconds, if not less (e.g., sub-second). In addition to maintaining processing time in this manner, the core network supports a high volume of operations. Operational throughput is defined as the rate at which operations are processed by the core network. A desired throughput may be up to $10^6$ (or higher) operations per second, although this is not a limitation.

In one embodiment, the above-described architecture provides a distributed ledger, namely, a financial message ledger. The ledger provides an immortal log of transactions, secured with blockchain technologies as described. When used in this context, the network includes the ability to interface with existing financial transaction systems, forwarding requests to and response from an acquirer (ACQ) and/or issuer (ISS). An alternative use case is a managed-value ledger, which enables the processing of transactions against a managed line of credit (or debit). This use case enables an ACQ/ISS to provision an on-network account balance that is subsequently credited/debited against without contact with the ACQ/ISS. Transactions that exceed the managed credit line can trigger a fallback to querying the ACQ/ISS to request approval. In a typical use, the transaction flow is as follows. A message is assumed to be approximately 1 KB in size. That message is received by the edge and distributed (from there) across the core blockchain network. After the transaction is finalized (and a blockchain receipt is received), a response is sent from the edge. In total, the maximum round trip time is preferably on the order of no more than two (2) seconds. In addition, the payment network is able to handle an end-of-day batch clearing process where an additional 1 KB message for every processed transaction is sent of the payment network for clearing. These batched transactions is expected to be processed and logged within a few hours.

Any other use case requiring processing of transactions at a high rate and with low latency may benefit from this architecture. The management of loyalty points is one non-limiting example of a non-monetary application.

The architecture herein is also highly secure. Encryption, authentication, digital signatures and other technologies are used to guarantee customer privacy and data integrity.

The techniques herein provide for a global system of record that exhibits high performance (in terms of number of transactions processed) and very low latency, all without sacrificing data security.

The managed network herein is a highly secure permissioned network. Accordingly, transaction collection and block construction times are reduced to near the time it takes to propagate a block across the network. The approach herein takes advantage of the fact that network latencies are generally sub-second between arbitrarily remote locations on the Internet; further, these latencies are further reduced by using the highly dispersed edge periphery and a less dispersed core in the manner that has been described.

The architecture described is highly-performant and overcomes the many problems that exist in known blockchain network environments, namely, network latencies, network utilization, confirmation depth, clock skew, topological bottlenecks and other factors. To facilitate the solution, as noted above preferably the core network itself has good geographic and topologic proximity. This is desirable, as consensus protocols (such as are used in a blockchain network) often rely on large volume messaging. Preferably, depending on the consensus protocol used, the core network is to have low network latency and high interconnectivity, as this ensures that block propagation times remain timely with respect to the system's response time requirements. The overlay's secure edge network is leveraged to ensure a fully global payment network that is still highly-secure and high performance.

Blockchain systems include the concept of confirmations. Once a transaction is confirmed and added to a block in the blockchain, it is considered to have one confirmation. Each subsequent block added to the blockchain increase the level of confirmation of that transaction. The more confirmations a transaction has, the more difficult it is for the transaction to be removed from the blockchain. Most blockchain systems adopt a convention of waiting a certain number of confirmations until a transaction is considered finalized and durable; this is referred to as the "confirmation depth." Preferably, the solution herein utilizes a configurable or variable confirmation depth to support transaction resiliency requirements.

Computing nodes in the core are time-synchronized, preferably using a time server.

The core network may be configured as a non-blocking full mesh interconnect topology. One preferred approach implements the core network as a highly resilient partial mesh interconnect topology. To balance resilience (to network outages and attacks) versus block propagation times, however, preferably an efficient topology-aware data propagation protocol is implemented, as has been described. The protocol is preferably built upon a multicast protocol where orchestration is done in the network layer.

As used herein, a node is a high (upper) level unit of computing on the network. Typically, a node comprises one or more physical machines (servers) that handle the node's workload. Preferably, the implementation of a node is abstracted away from other nodes; to such other nodes each peer node appears as a single entity on the network. To support the transaction rate (e.g., one (1) million transactions per second), preferably the node is configured into multiple physical machines. As noted above, preferably a node also has a time server that is used to produce timestamps accurate to less than a millisecond. In addition, a node includes a cryptographic engine and random number generator (RNG) server that is used to produce signatures and entropy needed for consensus. Finally, the node includes transaction processing servers that are responsible for processing incoming transactions and appending them onto the blockchain in the manner described above.

In the permission-based approach as has been described herein, a node proves itself as a miner by providing a mining proof. A mining proof is data presented by a node that mathematically proves the node is a legitimate miner of a block (or segment thereof). The proof is recorded in the block header such that proper blockchain construction (namely, trust) is self-verifiable. Without intending to be limiting, a distributed verifiable random function (DVRF) may be used to facilitate the mining proof. Alternative approaches include use of hardware-generated trusted random numbers.

Enabling Technologies

Figure 9:
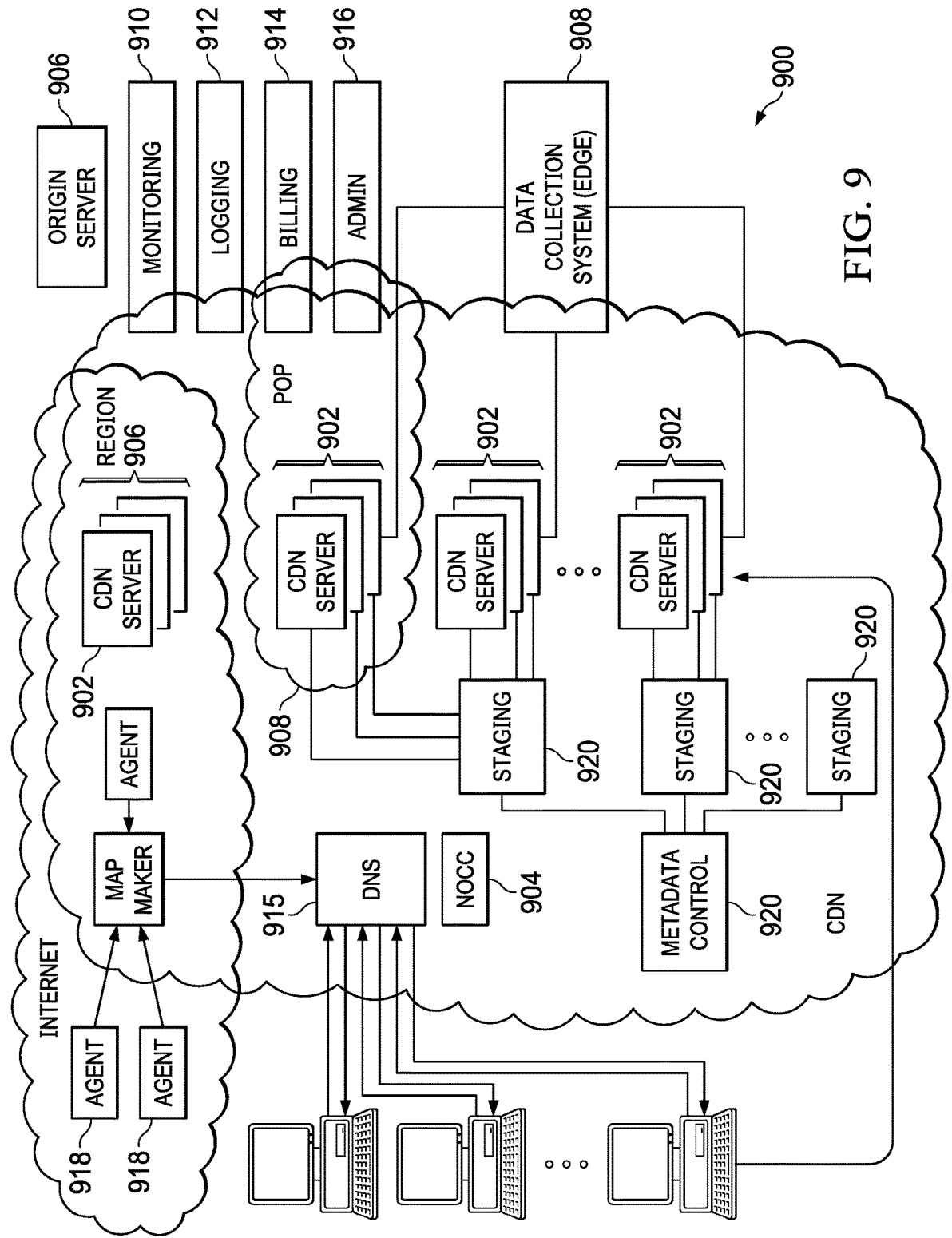
FIG. 9 depicts a content delivery network (CDN) architecture that may be associated with the computing network fabric.

As noted above, the techniques of this disclosure may be implemented within the context of an overlay network, such as a content delivery network (CDN), although this is not a limitation. In a known system of this type, such as shown in FIG. 9, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 10:
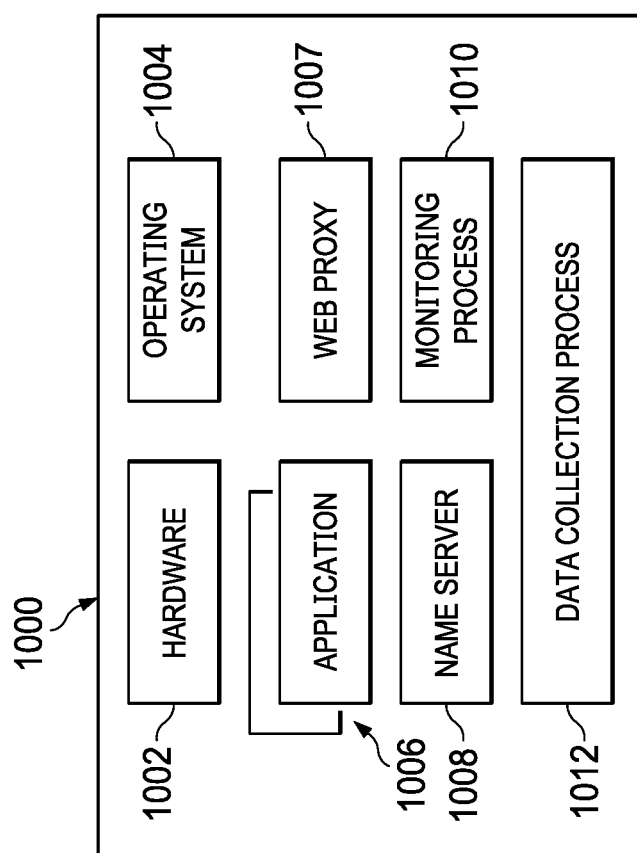
FIG. 10 depicts a representative machine configuration.

As illustrated in FIG. 10, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. The approach described there is sometimes referred to as an SSL-protected edge network. In a typical operating scenario, secure content delivery enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras, providing a key management service, and the like. In one embodiment here, wallet services may be located in front of or behind an SSL-protected edge network.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

The above-described client-to-edge server mapping technique may be used to associate a wallet or wallet service (the "client") with an edge server. In a typical use case, a transaction initiated from or otherwise associated with that wallet or wallet service then passes through the edge server and onward to the core for further processing as described herein. As noted above, the wallet or wallet service (or some portion thereof) may also reside inside the edge, such that wallet requests pass through the edge to the wallet or wallet service and onward to the core. Some portion of the transaction processing may be carried out at the edge server.

Each above-described process preferably is implemented in computer software as a set. of program instructions executable in one or more processors, as a special-purpose machine.

Representative machines on which the subject matter herein is provided may be Intel hardware processor-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields.

Each above-described process preferably is implemented in computer software as a set of program instructions executable in one or more processors, as a special-purpose machine.

The edge network may communicate with the core using various technologies. Representative overlay network technologies that may be leveraged include those described in U.S. Publication Nos. 2015/0188943 and 2017/0195161, the disclosures of which are incorporated herein by reference. Among other things, these publications describe the CDN resources being used facilitate wide area network (WAN) acceleration services over the overlay in general, as well as between enterprise data centers (which may be privately-managed) and third party software-as-a-service (SaaS) providers. In one typical scenario, a so-called routing overlay leverages existing content delivery network (CDN) infrastructure to provide significant performance enhancements for any application that uses Internet Protocol (IP) as a transport protocol by routing around down links or finding a path with a smallest latency. Another approach is to provide messages from the edge to the core using multicast, unicast, broadcast or other packet-forwarding techniques.

The techniques herein generally provide for the above-described improvements to a technology or technical field, as well as the specific technological improvements to various fields including distributed networking, distributed transaction processing, wide area network-accessible transaction processing systems, high performance, low latency transaction processing systems, non-blocking full mesh interconnect systems, and the like, all as described above.

OPR-hosted services as provided herein as just one example of how the overlay network infrastructure is useful to support the overlay network-payment network integration and interoperability as described above. The overlay network may be used to host other services (typically, servers) that facilitate operations associated with the payment network.

Having described the subject matter herein, what is claimed is as follows.

The invention claimed is:

1. A method operative in association with a set of transaction handling computing elements that comprise a network core that receive and process transaction requests into an append-only immutable chain of data blocks, wherein a data block is a collection of transactions, and wherein presence of a transaction recorded within a data block is verifiable via a cryptographic hash, wherein the transaction requests originate from legacy computing infrastructure, comprising:

configuring an overlay network between the legacy computing infrastructure and the network core, the overlay network comprising one or more edge servers that act as entry points for the transaction requests entering the network core, and one or more upstream edge servers from the one or more edge servers acting as the entry points, at least one of the upstream edge servers hosting a wallet service comprising a wallet processor;

configuring Transport Layer Security (TLS)-based mutually-authenticated connections between the plurality of edge servers acting as entry points and the legacy computing infrastructure;

the one or more edge servers acting as entry points receiving the transaction requests that originate in the legacy computing infrastructure, and routing the transaction requests to the wallet service;

the wallet service receiving and validating the transaction requests, and forwarding the validated transaction requests to be recorded on the append-only immutable chain of data blocks;

wherein first cryptographic keying material secures the TLS-based mutually-authenticated connections, and second cryptographic keying material distinct from the first cryptographic keying material secures a given transaction request.

2. The method as described in claim 1 wherein the upstream edge server in the overlay network hosting the wallet service stores keying material in an associated crypto server.

3. The method as described in claim 2 wherein the second cryptographic keying material comprises a JSON Web Token (JWT) key pair generated by the associated crypto server.

4. The method as described in claim 1 further including configuring an Application Programming Interface (API) gateway in association with the plurality of edge servers acting as entry points, wherein the API gateway supports one or more APIs associated with the legacy computing infrastructure.

5. The method as described in claim 1 wherein the network core computing elements host a distributed ledger system.

6. The method as described in claim 1 wherein the append-only immutable chain of data blocks is a blockchain.

7. The method as described in claim 6 wherein a given transaction in the blockchain is digitally-signed and self-verifiable.

8. The method as described in claim 1 wherein inbound connectivity from the network core computing elements to the legacy computing infrastructure, and outbound connectivity from the legacy computing infrastructure to the network core computing elements, are implemented without change to one or more transaction protocols associated with the legacy computing infrastructure.

9. The method as described in claim 1 wherein the TLS-based mutually-authenticated connections provide the legacy computing infrastructure secure and resilient access to the network core computing elements via the overlay network edge servers.

10. The method as described in claim 1 wherein the transaction requests are received from a merchant connector.

11. The method as described in claim 1 wherein the second cryptographic keying material comprises a JSON Web Token (JWT) key pair.

12. The method as described in claim 11 wherein the JWT key pair protects integrity of the given transaction request to maintain a chain of trust between a given merchant connector request and its associated payment network response.

13. The method as described in claim 1 wherein the wallet service is untrusted by the network core.

14. The method as described in claim 1 wherein each of the first and second cryptographic keying material has an associated root of trust.

15. The method as described in claim 1 wherein a given transaction request is an ISO8583 transaction request.

16. The method as described in claim 1 wherein the wallet service and the append-only immutable chain of data blocks comprise a payment network.

* * * * *